(12) United States Patent
Lehr et al.

(10) Patent No.: US 9,784,404 B2
(45) Date of Patent: Oct. 10, 2017

(54) LIGHTWEIGHT THERMAL SHIELD

(71) Applicant: Interface Performance Materials, Inc., Lancaster, PA (US)

(72) Inventors: Brian C. Lehr, Lancaster, PA (US); Jeffery L. Barrall, Lititz, PA (US); John S. Forry, Lancaster, PA (US)

(73) Assignee: Interface Performance Materials, Inc., Lancaster, PA (US)

( * ) Notice: Subject to any disclaimer, the term of this patent is extended or adjusted under 35 U.S.C. 154(b) by 0 days.

(21) Appl. No.: 14/990,566

(22) Filed: Jan. 7, 2016

(65) Prior Publication Data
US 2016/0116101 A1    Apr. 28, 2016

Related U.S. Application Data

(62) Division of application No. 14/187,001, filed on Feb. 21, 2014, now Pat. No. 9,297,596.
(Continued)

(51) Int. Cl.
*F16L 59/00* (2006.01)
*F16L 59/02* (2006.01)
(Continued)

(52) U.S. Cl.
CPC ............ *F16L 59/029* (2013.01); *B32B 1/06* (2013.01); *B32B 3/28* (2013.01); *B32B 3/30* (2013.01);
(Continued)

(58) Field of Classification Search
CPC .. F16L 59/029; B60R 13/0815; B60R 13/083; B60R 13/0838; B60R 13/0884
(Continued)

(56) References Cited

U.S. PATENT DOCUMENTS 1,342,664 A   6/1920  Fernand
3,212,811 A  10/1965  Strasser
(Continued)

FOREIGN PATENT DOCUMENTS

CN    1 850 502 A   10/2006
CN  102 879 877 A    1/2013

OTHER PUBLICATIONS

International Search Report for PCT/US2014/017829, dated Oct. 31, 2014.
Written Opinion for PCT/US2014/017829, dated Oct. 31, 2014.

*Primary Examiner* — Joseph D Pape
(74) *Attorney, Agent, or Firm* — Womble Carlyle Sandridge & Rice LLP

(57) ABSTRACT

A method of making a lightweight thermal shield that includes obtaining a mold having a shaped support screen with a molding surface configured to allow the passage of air and moisture therethrough, and with the mold being adapted for drawing a vacuum from behind the support screen. The method also includes applying a wet insulation material onto the molding surface of the support screen and drawing a vacuum to withdraw moisture through the support screen and consolidate a layer of insulation material on top the molding surface. The method further includes removing the consolidated layer of insulation material from off the molding surface, installing the consolidated layer of insulation material into an outer shell layer, and drying the consolidated layer of insulation material within the outer shell layer to form a lightweight core insulation layer.

13 Claims, 13 Drawing Sheets

Related U.S. Application Data

(60) Provisional application No. 61/767,854, filed on Feb. 22, 2013, provisional application No. 61/792,346, filed on Mar. 15, 2013.

(51) Int. Cl.

| | | |
|---|---|---|
| *F28F 9/20* | (2006.01) | |
| *B32B 5/22* | (2006.01) | |
| *B32B 5/26* | (2006.01) | |
| *B32B 15/02* | (2006.01) | |
| *B32B 15/14* | (2006.01) | |
| *B32B 15/18* | (2006.01) | |
| *B32B 15/20* | (2006.01) | |
| *B32B 1/06* | (2006.01) | |
| *B32B 3/28* | (2006.01) | |
| *B32B 3/30* | (2006.01) | |
| *B32B 5/02* | (2006.01) | |
| *B32B 38/00* | (2006.01) | |
| *B32B 37/10* | (2006.01) | |
| *F16L 59/04* | (2006.01) | |
| *F16L 59/08* | (2006.01) | |
| *B32B 38/16* | (2006.01) | |

(52) U.S. Cl.
CPC ............... *B32B 5/028* (2013.01); *B32B 5/22* (2013.01); *B32B 5/26* (2013.01); *B32B 15/02* (2013.01); *B32B 15/14* (2013.01); *B32B 15/18* (2013.01); *B32B 15/20* (2013.01); *B32B 37/1018* (2013.01); *B32B 38/164* (2013.01); *F16L 59/04* (2013.01); *F16L 59/08* (2013.01); *F28F 9/20* (2013.01); *B32B 2038/166* (2013.01); *B32B 2250/40* (2013.01); *B32B 2262/101* (2013.01); *B32B 2262/105* (2013.01); *B32B 2307/304* (2013.01); *B32B 2307/306* (2013.01); *B32B 2605/00* (2013.01)

(58) Field of Classification Search
USPC ........................................................ 296/39.3
See application file for complete search history.

(56) References Cited

U.S. PATENT DOCUMENTS

| | | |
|---|---|---|
| 3,677,365 A | 7/1972 | Wright et al. |
| 3,698,440 A | 10/1972 | Matthieu et al. |
| 4,315,558 A | 2/1982 | Katayama |
| 5,385,790 A | 1/1995 | Atkinson et al. |
| 5,464,952 A | 11/1995 | Shah et al. |
| 5,547,628 A | 8/1996 | Lacombe et al. |
| 5,680,757 A | 10/1997 | Pirchl |
| 5,958,603 A * | 9/1999 | Ragland ............... B60R 13/08 428/595 |
| 5,974,784 A | 11/1999 | Feldman |
| 5,996,730 A | 12/1999 | Pirchl |
| 6,276,044 B1 | 8/2001 | Ragland et al. |
| 6,279,229 B1 | 8/2001 | Lemke et al. |
| 6,438,949 B1 | 8/2002 | Nozaki |
| 6,454,048 B1 | 9/2002 | Alts et al. |
| 6,647,715 B2 | 11/2003 | Farkas |
| 6,660,403 B2 | 12/2003 | Ragland et al. |
| 6,786,521 B1 | 9/2004 | Jaffke et al. |
| 6,966,402 B2 | 11/2005 | Matias et al. |
| 7,162,868 B2 | 1/2007 | Funakoshi |
| 7,445,084 B2 | 11/2008 | Berbner et al. |
| 7,585,559 B2 | 9/2009 | Schroeder et al. |
| 7,726,216 B2 * | 6/2010 | Hofmann ............ B60R 13/0876 74/606 R |
| 7,851,069 B2 | 12/2010 | Starr |
| 7,870,931 B2 | 1/2011 | Wildhaber |
| 7,934,580 B2 | 5/2011 | Van de Flier et al. |
| 7,942,237 B2 | 5/2011 | Van de Flier et al. |
| 8,608,237 B2 | 12/2013 | Hwang et al. |
| 2004/0142152 A1 | 7/2004 | Chen et al. |
| 2010/0096181 A1 | 4/2010 | Nakamura |

* cited by examiner

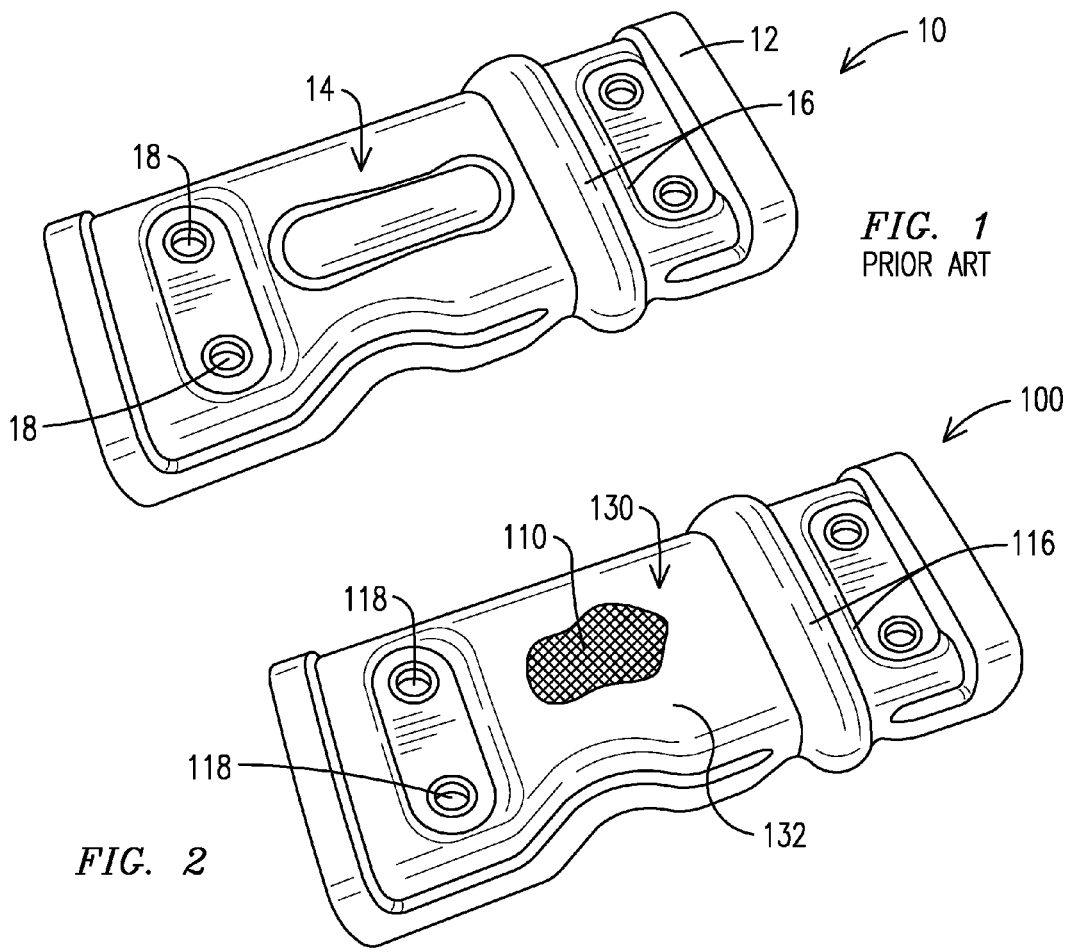
FIG. 1
PRIOR ART
FIG. 2
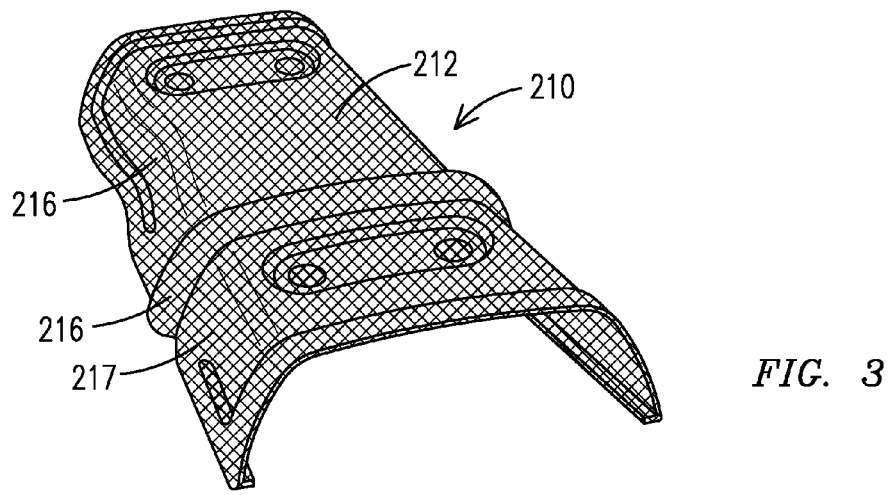
FIG. 3

LIGHTWEIGHT THERMAL SHIELD

RELATED APPLICATIONS

This patent application is a divisional of U.S. patent application Ser. No. 14/187,001, filed 21 Feb. 2014 and entitled "Lightweight Thermal Shield", which claims the benefit of U.S. Provisional Patent Application No. 61/767,854, filed on 22 Feb. 2013 and entitled "Lightweight Thermal Shield", and U.S. Provisional Patent Application No. 61/792,346, filed on 15 Mar. 2013 and entitled "Lightweight Thermal Shield with a Compliant Insulation Layer", each of which is incorporated by reference in its entirety herein.

TECHNICAL FIELD

This application relates generally to thermal shields for use in high temperature applications, and in some embodiments to lightweight thermal shields in vehicles for protecting temperature-sensitive components from nearby sources of radiating heat.

BACKGROUND

Heat shields in vehicular applications are used to protect electronic packages, sensors, wiring, and other heat-sensitive systems from the hot components of the vehicle that operate at high temperatures and radiate substantial amounts of heat. A non-limiting list of such components includes the turbo charger, the exhaust manifold, the exhaust piping, the catalytic converter, and the like. The hot components can often operate at temperatures above 600° C., and may even reach 800° C. at certain locations, and are generally located in the engine compartment where ventilation is limited or under the vehicle where the heat-sensitive systems cannot be relocated further away from the heat source.

One conventional heat shield for such applications is formed from two relatively-thick metallic sheets, or sheet metal layers, that have been pressed or stamped into a desired three-dimensional shape and coupled together around their peripheral edges to form a substantially rigid hollow shell body. The shape of the shell body may be contoured to fit within the limited and often-narrow space that is available within the vehicle between the hot component and the protected device or sensor. In addition, the two metallic sheets that form the shell body are generally separated by a thin core layer of a flexible insulating fabric that serves to prevent the interior surfaces of the sheet metal layers from contacting or rubbing against each other. The outer surface of the metallic sheet layer closest to the heat source is often configured to reflect radiated heat away from the heat shield, while the core layer of insulating fabric blocks the path of heat conduction between the two sheet metal layers. The heat shield also generally includes fastening provisions, such as bolt holes or clips, for mounting the heat shield to the frame or structure of a vehicle.

In addition to providing a thermal barrier for protecting the heat-sensitive systems and devices located near the hot components, vehicular heat shields are also built to withstand high vibration levels. Such vibration levels can be generated by the various sources of vibration produced within a vehicle, including the internal combustion engine, transmission, compressors, pumps, cooling fans, the rotating belts and sheaves that power the various auxiliary vehicle systems, as well as any road-induced vehicular vibrations transmitted through the tires and the suspension. To avoid structural failure from high-cycle fatigue, the metallic sheets or sheet metal layers are often designed with robust, relatively thick walls and stiffening structures or embossments that reduce the heat shield's natural response to vibration. Unfortunately, this also increases the weight of the device, even when the metal layers are fabricated from aluminum alloy. When added together, the combined weight of all the components of the heat shields can generally result in a significant weight penalty for the vehicle.

Consequently, a need exists for thermal or heat shields for vehicles that can provide suitable thermal protection for heat-sensitive systems while maintaining their structural integrity, and that also weigh less than existing heat shields. It is toward such a lightweight thermal shield that the present disclosure is directed.

SUMMARY

Briefly described, one embodiment of the present disclosure comprises a lightweight thermal shield that includes a support screen configured to allow the passage of moisture therethrough. The support screen has an upper or first surface, a lower or second surface, a perimeter, and at least one curved portion extending out-of-plane to form a three-dimensional shape. The lightweight thermal shield also includes an insulation layer that is adhered to the upper or first surface of the support screen and that substantially conforms to the shape of the support screen.

Another embodiment of the disclosure comprises a method of making a lightweight thermal shield that includes obtaining a mold having a shaped and perforated molding surface within a sealable enclosure. The method also includes obtaining a support screen that is configured to allow the passage of moisture therethrough and having a shape that substantially conforms to the shape of the molding surface, and installing the support screen onto the molding surface in the mold. The method further includes applying a slurry of wet insulation material onto the upper surface of the support screen opposite the molding surface, sealing the sealable enclosure, and pulling a vacuum in the mold to withdraw the moisture from the wet insulation material and form a consolidated layer of insulation material that is adhered to the support screen. Once complete, the support screen and the adhered layer of insulation material can be removed together from the mold and dried to form the lightweight thermal shield.

Yet another embodiment comprises a lightweight thermal shield that includes a first support layer and a second support layer, each support layer being made from a shapeable yet resiliently-bendable material that has been sized and formed into a three-dimensional shape, and coupled together along their respective perimeter portions to form a resiliently-bendable shield body having a desired three-dimensional shape, and that encloses a cavity. The thermal shield further includes a layer of insulation material substantially filling the cavity between the interior surfaces of the first and second support layers. The layer of insulation material is compliant and bendable to conform with the shield body while maintaining a thermal barrier between the interior surfaces of the first and second support layers.

Another embodiment of the disclosure comprises a method of making a lightweight thermal shield that includes obtaining a first support layer comprising a resiliently-bendable material formed into a first shape and having a first perimeter portion bounding a first interior surface, obtaining a second support layer comprising the resiliently-bendable material formed into a second shape complimentary with the first shape and having a second perimeter portion bounding a second interior surface, and obtaining an insulation material comprising a compliant bundle of insulating fibers. The method further includes applying the insulation material over the first interior surface of the first support layer, and coupling the second perimeter portion to the first perimeter portion to form a shield body having a cavity between the first interior surface and the second interior surface, and with the cavity being substantially filled with the insulation material. The insulation layer is bendable with the shield body while maintaining a thermal barrier between the first interior surface and the second interior surface.

Yet another embodiment of the disclosure comprises a thermal shield that includes a solid outer shell layer having an outer surface, an inner surface, a thickness between the inner surface and the outer surface, and at least one curved portion extending out-of-plane to form a shape in three-dimensions. The thermal shield further includes a core insulation layer coupled to the inner surface and substantially conforming to the shape of the outer shell layer, with the core insulation layer being formed from at least one layer of low density, dried fibrous insulation material having a thickness greater than or about ten times the thickness of the outer shell layer.

Another embodiment of the disclosure comprises a method of making a lightweight thermal shield that includes obtaining a mold having a shaped support screen with a molding surface configured to allow the passage of air and moisture therethrough, and with the mold being adapted for drawing a vacuum from behind the support screen. The method also includes applying a wet insulation material onto the molding surface of the support screen and drawing a vacuum to withdraw moisture through the support screen and consolidate a layer of insulation material on top the molding surface. The method further includes removing the shaped and consolidated layer of insulation material from off the molding surface, installing the consolidated insulation material into a solid outer shell layer, and drying the consolidated insulation material within the outer shell to form a lightweight core insulation layer.

The invention will be better understood upon review of the detailed description set forth below taken in conjunction with the accompanying drawing figures, which are briefly described as follows.

BRIEF DESCRIPTION OF THE DRAWINGS

FIG. 1 is a perspective topside view of an example thermal shield as currently found in the prior art.

FIG. 2 is one perspective topside view of a lightweight thermal shield, in accordance with a representative embodiment of the present disclosure.

FIG. 3 is a perspective topside view of a support screen for forming a singled-sided thermal shield, in accordance with another representative embodiment.

Figure 4:
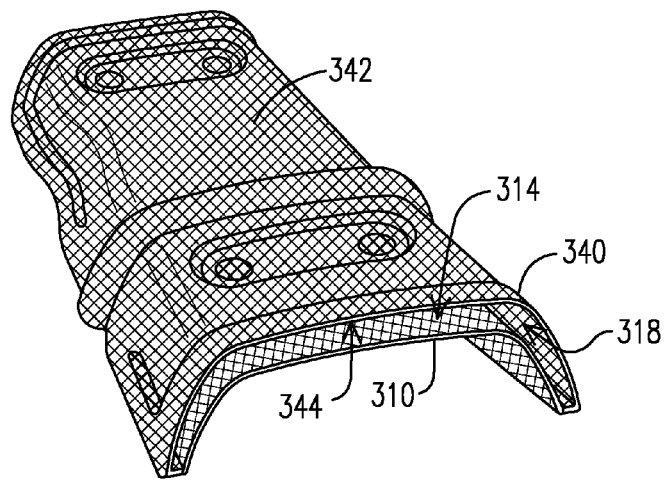
FIG. 4 is a perspective topside view of a pair of coupled support screens for forming a double-sided thermal shield, in accordance with yet another representative embodiment.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Referring now in more detail to the drawing figures, wherein like parts are identified with like reference numerals throughout the several views, FIG. 1. illustrates an example heat shield 10 for vehicles as typically may be found in the prior art. The conventional heat shield 10 is formed from two metallic sheets 12, or sheet metal layers, that have been punched or stamped into a desired three-dimensional shape that fits within the often-confined space that is available within the vehicle for separating the high temperature component of the vehicle and the protected, heat-sensitive device or sensor. One or both of the metallic sheets 12 is often provided with a reflective outer surface 14 that is configured to deflect radiated heat away from the heat shield, while a thin insulating fabric sheet (not shown) is sandwiched between the sheets 12 to prevent the interior surfaces of the clam shells from contacting each other, and thereby blocking the path of heat conduction through the body of the thermal shield 10.

The stamped metallic sheets 12 of the heat shield 10 pictured in FIG. 1 also include various curved surfaces and embossed features 16 that allow the heat shield 10 to be positioned and oriented into the desired space. The stamped features 16 may also provide additional support and stiffening for controlling the heat shield's response to external vibration. As can be seen, the heat shield 10 also includes bolt holes 18 formed through both the metallic sheets 12 and the flexible insulating fabric for mounting the shield to the frame or structure of the vehicle. Although effective at controlling heat and resisting vibration, heat shields of the type shown in FIG. 1 are relatively massive and heavy because each shield comprises two thick metallic sheets placed side by side, which results in a significant weight penalty for the vehicle when the weights of all the components of the heat shields are combined together.

Illustrated in FIG. 2 is a lightweight thermal shield 100 in accordance with one representative embodiment of the present disclosure. The thermal shield 100 includes a support screen 110 made from a mesh material that has been sized and formed into the desired three-dimensional shape for the finished thermal shield. In one aspect, the shape of the support screen 110 can closely match the shape of the conventional metallic heat shield that the lightweight thermal shield 100 is intended to replace. The support screen further can include similar surface features 116 and bolt holes 118 that allow the heat shield 100 to be positioned and oriented into the same desired space within the vehicle, and that may also provide support and stiffening for controlling the heat shield's response to external vibration. In other aspects, however, the shape of the support screen and the completed heat shield can comprise an entirely new structure that takes advantage of the many beneficial features provided by the lightweight thermal shield of the present disclosure.

The thermal shield 100 also includes an insulation layer 130 that can be adhered to an inner or first surface of the support screen 110, and that can substantially conform to the shape of the support screen 110. The insulation layer 130 can comprises an insulation material 132 that is infused into the mesh material of the support screen 110 when wet to fill the voids between the filaments of the mesh material, and is then dried to form the substantially rigid insulation layer 130. In one aspect, the insulation material 132 may extend completely through the mesh material of the support screen 110 and partially beyond the outer or second surface of the support screen, so that the support screen 110 is substantially surrounded and enclosed by the insulating layer 130. In other words, the support screen 110 can be surrounded and enclosed by a majority portion of the insulation layer 130 on the inner or first surface, and by a minority portion of the insulation layer on the outer or second surface.

During manufacture of the thermal shield 100, the insulation material 132 may be applied as a wet slurry to the inner or first surface of the support screen 110, and then shaped, de-watered, and dried into the solid, rigid insulation layer 130 that can substantially conform to the shape of the support screen 110 as it becomes adhered to or infused into the support screen. In one aspect the dried insulation material can be formed on the support screen 110 with a substantially constant thickness. Furthermore, and unlike the thin and pliable insulating fabric material generally found in prior art heat shields that simply serve as an insulation filler, the dried layer 130 of insulation material 132 can provide a substantial portion of the stiffness and structure of the overall thermal shield 100.

In accordance with another representative embodiment, FIG. 3 is a perspective topside view of a support screen 210 for a singled-sided, lightweight thermal shield prior the addition of the insulation layer. The support screen 210 can comprise a generally planar sheet of mesh material 212 that has been formed into a three-dimensional shape with curved features 216 that extend out-of-plane to the initial plane of the sheet. The support screen 210 can further include edging or sidewalls 217 that also extend out-of-plane to form a thermal shield having a concave side and a convex side. Both the curved features 210 and the sidewalls 217 can provide stiffening for the thermal shield. It is to be appreciated that the insulation material that is dried to form the insulation layer can be applied to either the convex side or the concave side of the support screen 210.

The support screen 210 can be made from a mesh material 212 that is sufficiently malleable to be formed, pressed or molded into an impressed shape, while also including sufficient rigidity and stiffness to substantially maintain that shape until pressed or worked into another shape. In addition, the mesh material 212 can be resiliently-bendable after being formed into the impressed shape in that it remains sufficiently compliant and flexible to withstand, without damage, substantial out-of-plane flexing in response to an applied force or vibration, and then naturally return to the impressed shape when released and allowed to relax back into a free-standing state. However, although the mesh material 212 can be resiliently-bendable in an out-of-plane direction (i.e. substantially perpendicular to the local plane of the material layer), the mesh material 212 can also be resistant or substantially resistant to elastic stretching or compression within the plane of the support screen 210.

In one aspect, the mesh material 212 can be a metallic wire screen, such as a screen made from stainless steel wire. In other aspects the mesh material 212 can be a non-metallic material, such as composite polymer-reinforced fiber or fiberglass material, a substantially homogeneous thermoplastic or thermoset material, and the like, and that is initially shaped while heated and then cooled to form a rigid polymer mesh.

FIG. 4 is a perspective topside view of a pair of coupled support screens 310, 340 for a double-sided thermal shield, in accordance with yet another representative embodiment. As pictured, a first support screen 310 is formed from a mesh material having an upper or inner surface 314 for contacting the insulation layer, and a second support screen 340 formed from the same or from a different mesh material 342 having a lower or inner surface 344 that also contacts the insulation layer, thus forming an enclosed volume 318 that is configured to receive the wet insulation material during the manufacturing processes.

Figure 5:
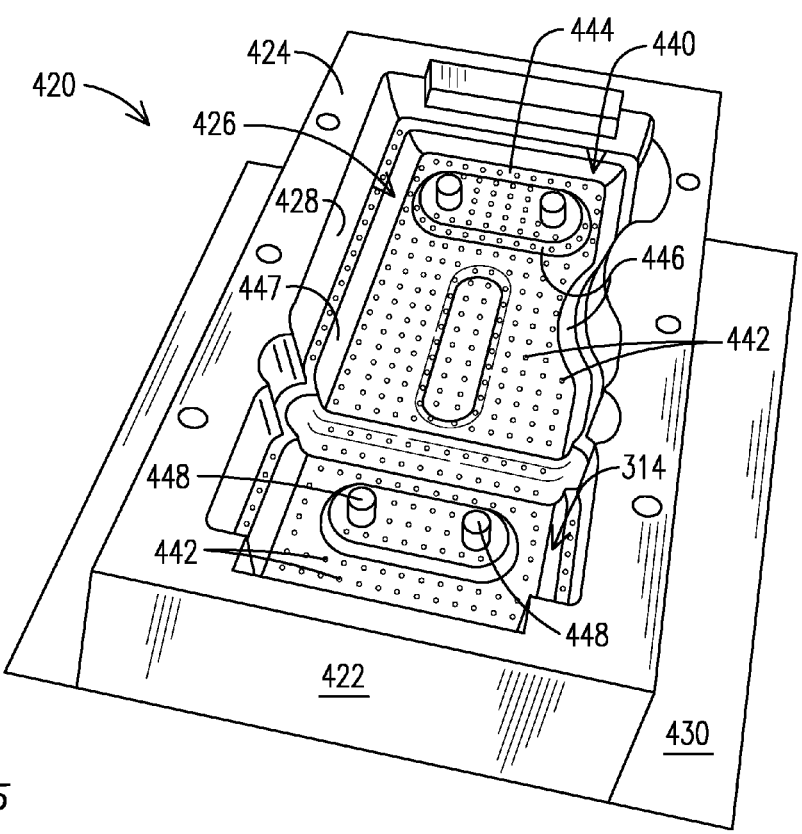
FIG. 5 is a perspective view of a mold and its perforated and shaped molding surface, in accordance with another representative embodiment.

FIG. 5 is a perspective view of a mold 420 having a shaped and perforated molding surface 440, in accordance with another representative embodiment of the present disclosure. The mold 420 can be made from a block of metal 422, such as aluminum, having a top surface 424 that is easily machined to form an upper cavity 426 with perimeter walls 428 and the molding surface 440 at the bottom. The molding surface 440 can include a bottom surface 444, curved surface features 446, edging or sidewalls 447, and posts 448 for forming holes that are complimentary with the structural features formed into the support screen described above (FIG. 3). The mold 420 is configured for attachment within a sealable enclosure, which can be a sealable cover (not shown) that fits around the outer sidewalls 422 of the mold 420 to seal against the top surface of a base plate 430.

In one aspect, the block of metal 422 can further include a plurality of perforation holes 442 drilled through the molding surface 440 from the upper cavity 426 to an underside surface. The perforation holes 442 can be equally spaced across the bottom surface 444, the curved surface features 446, and the sidewalls 447 of the molding surface 440. In one aspect, the underside surface can also be machined to form a lower cavity (not shown) that reduces the length of the perforation holes 442 through the metal block 422. In addition, the underside of the mold 420 or the supporting base plate 430 can be adapted for coupling to a source of vacuum, so that the vacuum can be pulled or drawn from below the mold 420 and through the perforation holes 442 in the molding surface 440. The source of vacuum can be a vacuum pump or a similar device that is placed in fluid communication with the perforation holes 442 extending through the molding surface 440.

Figure 6:
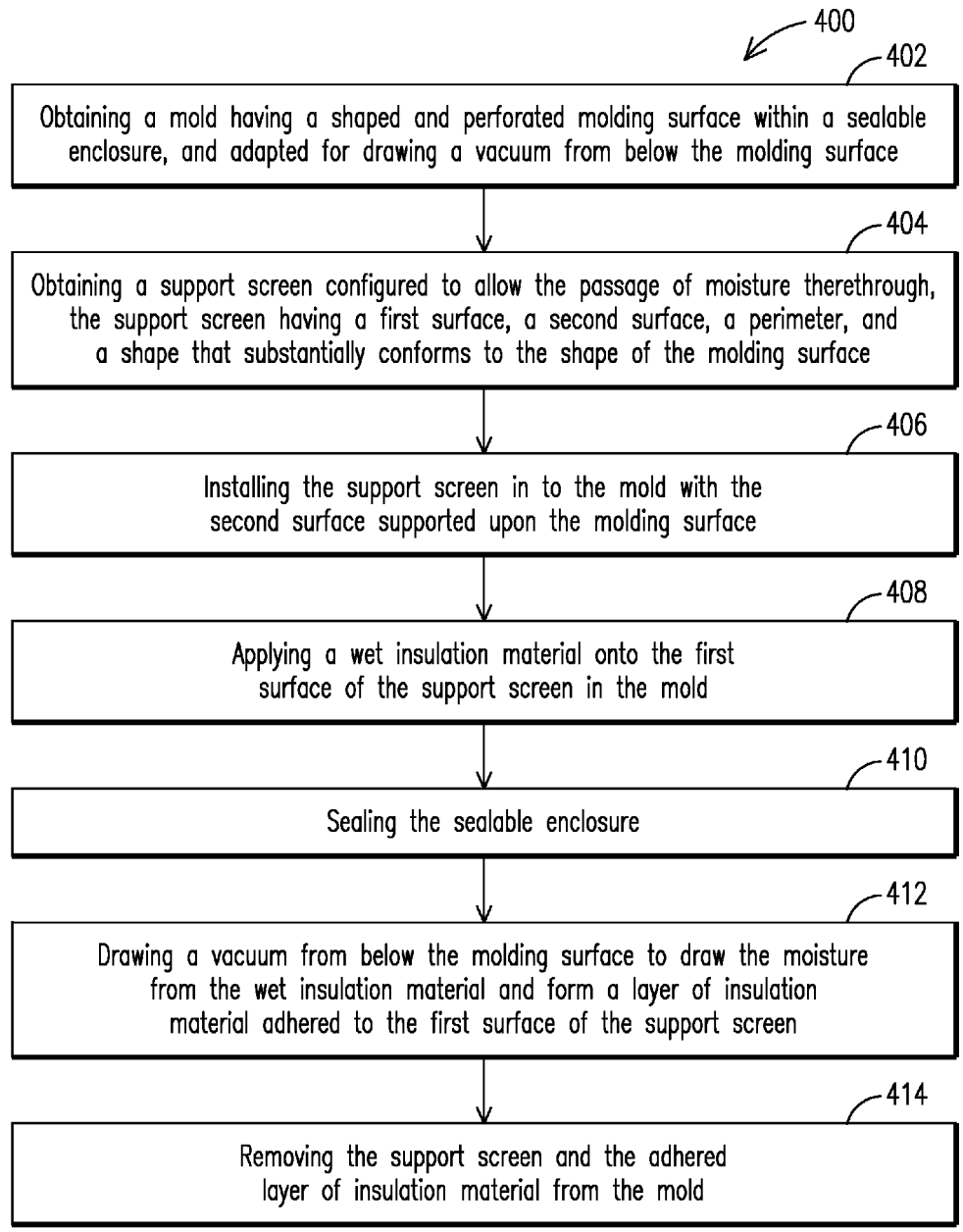
FIG. 6 is a flowchart depicting a method of making a lightweight thermal shield, in accordance with another representative embodiment.

FIG. 6 is a flowchart depicting a method 400 of making a lightweight thermal shield, in accordance with another representative embodiment. The method 400 includes obtaining 402 a mold having a shaped and perforated molding surface within a sealable enclosure, and that is adapted for drawing a vacuum from below the molding surface. The mold is at least functionally similar to the mold 420 described above in reference to FIG. 5, although it is to be appreciated that the size, shape and surface features of the molding surface 440 shown therein are merely illustrative of one representative embodiment of the molding surface 440, and that both the mold and the molding surface can be formed with a wide variety of sizes, shapes and surface features for making thermal shields in a correspondingly wide variety of sizes and three-dimensional shapes.

The method 400 also includes obtaining 404 a support screen configured to allow the passage of moisture therethrough. Similar to the support screen shown in FIG. 3, the support screen has an upper or first surface, a lower or second surface, a perimeter, and a shape that substantially conforms to the shape of the molding surface. More specifically, the shape of the lower or second surface can be the reverse or mirror image of the shape of the molding surface so that the pre-shaped support screen substantially conforms to the shape of the molding surface when placed within the mold. In some aspects the support screen can comprises of a pair of coupled support screens, similar to those shown in FIG. 4, for forming a double-sided thermal shield.

The method 400 further includes installing 406 the support screen into the mold with the lower or second surface supported upon on the molding surface, and applying 408 a slurry of wet insulation material onto the upper or first surface of the support screen in the mold. The wet insulation material can comprise a variety of mixtures that become substantially rigid, low-density insulating layers after de-watering, consolidation and drying.

In one aspect, the wet insulation material can be a pulp or fiber based slurry such as those used to make heat and flame resistant millboard. For instance, the insulation material can include one or more of the following types of fibers: ceramic fiber, bio-soluble ceramic fiber, mineral wool, bio-soluble mineral wool, rock wool, fiberglass, or high temperature fiberglass. The fibers can be used individually or in combination and in an amount ranging from 1% to 90% by weight of the insulation mixture.

In another aspect the insulation material can also include one or more binders, such as colloidal silica or sodium silicate, that can be used individually or in combination and in an amount ranging from 1% to 50% by weight of the insulation mixture.

In another aspect the insulation material can also include one or more fillers, such as bentonite clay, vermiculite, or Sepiogel-F™, that can be used individually or in combination and in an amount ranging from 1% to 70% by weight of the insulation mixture.

In another aspect the insulation material can also include one or more coagulants, such as Nalco 7607™, Kymene 736™, Alum™, Polymin PR 971 L™, or Perform PC1279 F™, that can be used individually or in combination and in an amount ranging from 1% to 30% by weight of the insulation mixture.

In another aspect the insulation material can also include one or more retention aids, such as Nalkat 7530™, Nalkat 625™, or PC8179™, that can be used individually or in combination and in an amount ranging from 1% to 50% by weight of the insulation mixture.

In one representative embodiment the wet fibrous insulation material can comprise a mixture of ceramic fibers, clay, inert fillers, and organic and/or inorganic binder components, similar to the mixtures used to make 1401 millboard.

In another representative embodiment, the fibrous insulation mixture can comprise a rock wool/mineral wool formulation that includes approximately 47.4% dry weight of Fibrox 300™ mineral wool, 31.6% dry weight of Lapinus RS-475™ rock wool, 9.6% dry weight of Towerbond™ bentonite clay, 9.6% dry weight of Ludox™ colloidal silica, 1.6% dry weight of Nalco 7607™, and 0.03% dry weight of Nalkat 625™ anionic retention aid.

In yet another representative embodiment, the fibrous insulation mixture can comprise a high temperature fiberglass formulation that includes approximately 78.9% dry weight of Belcotex 225 SC 6 550 fiberglass, 9.6% dry weight of Towerbond™ bentonite clay, 9.6% dry weight of Ludox™ colloidal silica, 1.6% dry weight of Nalco 7607™, 0.2% dry weight of PC 8179™ cationic retention aid, and 0.05% dry weight of Nalkat 625™ anionic retention aid.

In embodiments where the support screen comprises of a pair of coupled support screens, the wet insulation material can be injected into the cavity between support screens that have been pre-coupled together. In another aspect, the second support screen can be set into the layer of wet insulation material after the wet insulation material has been evenly distributed over the first support screen, and then the two support screens can be coupled together around their perimeter edges after the insulation material has been de-watered and consolidated and dried.

The method 400 also includes sealing 410 the sealable enclosure and drawing 412 a vacuum from below the molding surface to draw the moisture from the wet insulation material and form a layer of insulation material that is adhered to the first surface of the support screen and/or infused within the voids and interstices of the support screen. Referring again to the mold 420 illustrated in FIG. 5, the sealable enclosure can seal around the top surface 424 and upper cavity 426 of the mold 420, and can be substantially airtight so that a strong vacuum can be drawn that continuously evacuates and reduces the volume of air within the sealable enclosure. In the alternative, the sealable enclosure may not be completely airtight so that only a moderate vacuum is pulled that still allows for a minimal amount of leakage of air into the sealed enclosure, such as around the joint where the enclosure cover contacts the top surface of the base plate.

Regardless of the configuration for the sealable enclosure, the drawn vacuum can be sufficient to pull or withdraw the moisture from the wet insulation material while the fibers or other solid materials are trapped on top and/or within the interstices of the support screens, depending on the fineness of the mesh material. For example, the fibers or other solid materials can form an insulation layer on top a finely woven support screen, or can extend into the interstices of a coarsely woven mesh material to mechanically adhere or bond the insulation layer to the support screen.

In one aspect, the de-watered and consolidated insulation layer can have a substantially constant thickness that can range from about ⅛ inch to about ½ inch. Without being bound to any particular mechanism, it is contemplated that the de-watered insulation layer can have a substantially constant thickness because the vacuum is initially drawn through the grid of perforation holes in the molding surface, and is then further distributed by the gaps between the wire mesh of the support screen. This can pull the insulation material to every portion of the support screen, including the inclined or vertical sidewalls, with a substantially uniform suction. In addition, the layer of de-watered and consolidated fibers or other solid materials can also be somewhat porous to allow the vacuum to continue to pull additional insulation material onto the fibers or other solid materials that have already been drawn against the support screen.

In another aspect of the present disclosure, in which the upper or first surface of the support screen forms an upwardly-facing concave cavity with the sidewalls of the support screen, the amount of wet insulation material applied to the support screen in the mold can be sufficient to substantially fill the volume bounded by the upper or first surface and the sidewalls, so that an exposed surface of the insulation layer is substantially level and the thickness of the insulation layer varies in accordance with the curved surface features formed into the support screen.

In yet another aspect, the moisture in the wet insulation material may be withdrawn or removed using methods and equipment other than the vacuum molding process discussed above, such as spinning the wet insulation material and the support screen together within a centrifuge, compressing the wet insulation material and the support screen together in a press, and the like.

In yet another aspect of the present disclosure, the shaped support screen can be provided with sufficient stiffness and rigidity so that it does not require the support of an underlying molding surface to maintain its shape during the vacuum de-watering process. Instead, the shaped support screen may be placed on a non-conforming framework (not shown) within the mold that operates to buttress or support the shaped support screen over the source of vacuum. The non-conforming framework may support the shaped support screen around the perimeter of the support screen and/or at one or more locations under the body of the support screen. In addition, the non-conforming framework may be configured to seal around the perimeter edge of the support screen so that the vacuum is channeled to pull the moisture from across the central portion of the support screen.

The method 400 further includes removing 414 the support screen and the adhered layer of insulation material together from the mold.

In addition to the above steps, the method of making a lightweight thermal shield can further include drying the layer of insulation material, which may also complete the bonding between the layer of insulation material and the support screen. In one aspect, the drying step can be performed while the support screen and the layer of insulation material are still mounted within the mold. In another aspect, the drying step can be performed in a separate oven after the support screen and adhered layer of insulation material have been removed from the mold. Through the drying process the layer of insulation material can become a rigid but low-density structural member that, together with the support screen adhered to one side the insulation layer, becomes a thermal shield that weighs substantially less than existing conventional metallic heat shields, and that can also provide suitable thermal protection for heat-sensitive systems while maintaining its structural integrity.

Figure 7:
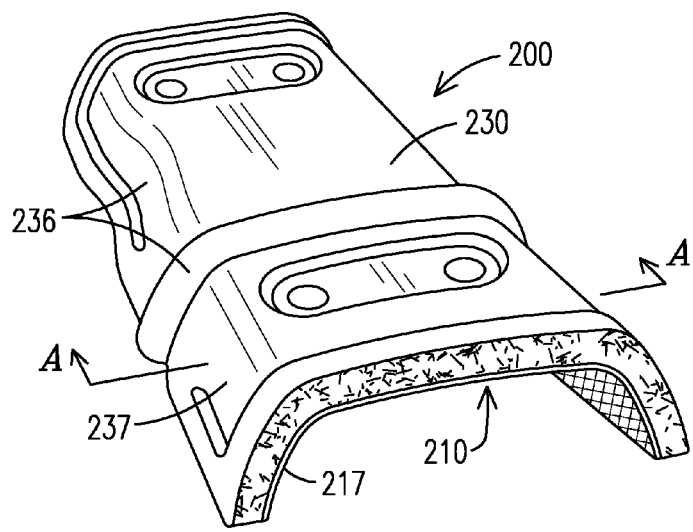
FIG. 7 is a perspective view of a completed single-sided thermal shield, in accordance with another representative embodiment.
Figure 8:
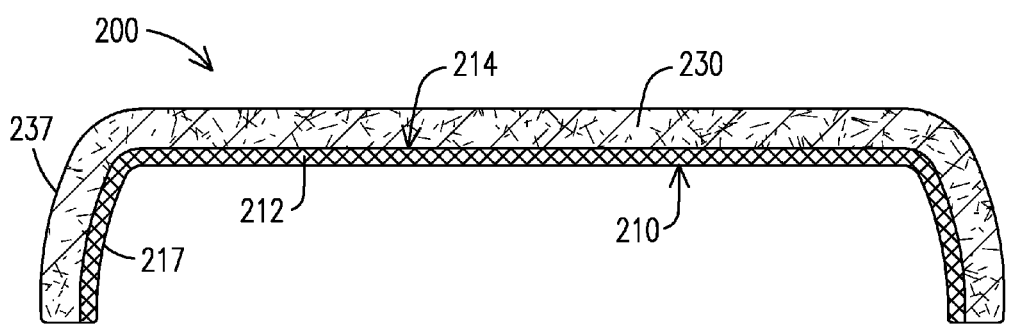
FIG. 8 is a schematic cross-sectional view of the completed single-sided thermal shield of FIG. 7, as viewed from Section Line A-A.

FIG. 7 is a perspective topside view of a completed single-sided thermal shield 200 having a insulation layer 230 adhered to the first or upper surface 214 of the support screen 210 of FIG. 3. FIG. 8 is a schematic cross-sectional view of the completed single-sided thermal shield of FIG. 7 as viewed from Section Line A-A. As can be seen in the two drawings, the insulation layer 230 can have a substantially constant thickness that conforms to the three-dimensional shape of the underlying support screen 210, including the curved surface features 236 that are layered over the out-of-plane curved features 216 (FIG. 3) of the support screen 210 as well as the sidewalls 237 that are layered over the edging or sidewalls 217.

Figure 9:
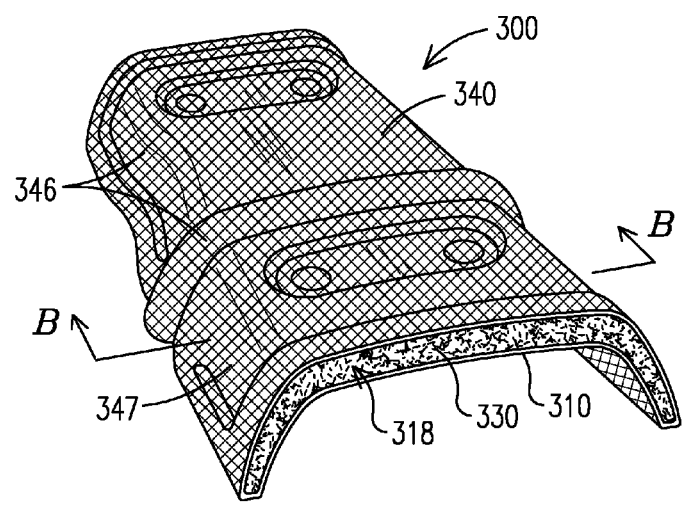
FIG. 9 is a perspective view of a completed double-sided thermal shield, in accordance with another representative embodiment.
Figure 10:
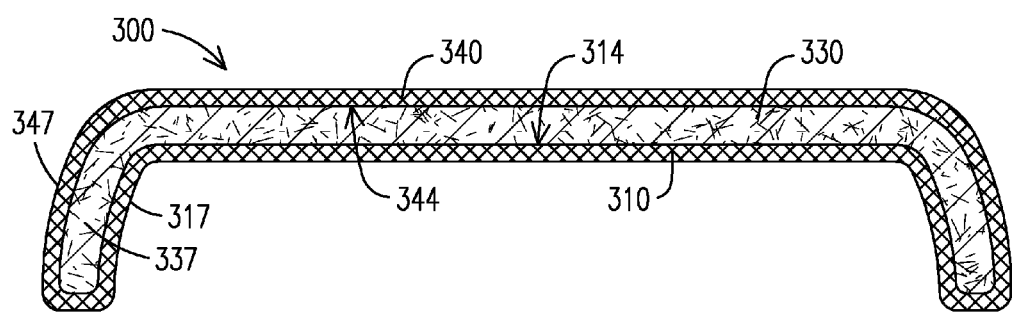
FIG. 10 is a schematic cross-sectional view of the completed double-sided thermal shield of FIG. 9, as viewed from Section Line B-B.

FIG. 9 is a perspective topside view of a completed double-sided thermal shield 300 having a insulation layer 330 simultaneously adhered to both the first or upper surface 314 of the first support screen 210 and to the lower or inner surface 344 of the second support screen 340 illustrated in FIG. 4. FIG. 10 is a schematic cross-sectional view of the completed double-sided thermal shield of FIG. 9 as viewed from Section Line B-B. As used herein, the term "double-sided" refers to support screens 310, 340 being located proximate both sides of the insulation layer 330, and with the insulation material being adhered to or infused into the inner surfaces of both screens. It is contemplated that providing support screens 310, 340 on both sides of the insulation layer 330 may result in the thermal shield 300 having a greater strength and a greater long-term resistance to the high vibration environment of the vehicle.

As can also be seen in FIGS. 9 and 10, the insulation layer 330 can substantially conform to the three-dimensional shapes of both support screens 310, 340. This can include both the curved features that are layered between the out-of-plane curved features 447 of the second support screen 340 and the first support screen 310, as well as the sidewalls 337 that are layered between the edging or sidewalls 347, 317 of the second support screen 340 and the first support screen 310, respectively.

During the manufacture of the double-sided thermal shield 300, the wet insulation material may be injected into the cavity 318 between the first support screen 310 and the second support screen 340. In one aspect the insulation material may be injected with sufficient pressure to fill the cavity 318 completely and press upward against the second support screen 340, so that the fibers and other solids are trapped against the inner surfaces 314, 344 of both support screens 310, 340, respectively, and prior to the drawing of the vacuum to remove the moisture from the insulation material.

Figure 11:
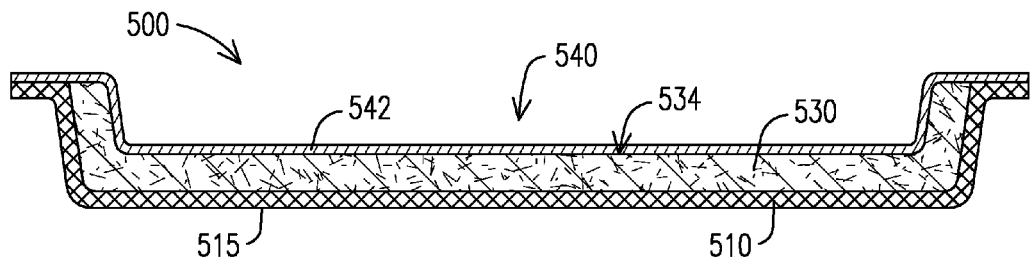
FIG. 11 is a schematic cross-sectional view of a lightweight thermal shield, in accordance with another representative embodiment.

FIG. 11 is a schematic cross-sectional view of another embodiment of the lightweight thermal shield 500, in which the exposed surface 534 of the insulation layer 530 is covered with a non-structural layer 540, such as a reflective metallic foil 542. The reflective metallic foil 542 can be added after the support screen 510 and the adhered layer of insulation material 530 have been removed together from the manufacturing mold, and in one aspect may be bonded to the exposed surface 534 of the insulation layer 530 with an adhesive.

In the illustrated configuration, the support screen 510 that is adhered to one side of the insulation layer 530 can provide the thermal shield 500 with sufficient structural integrity and long-term resistance to the high vibration environment of the vehicle, while the reflective foil 542 can provide for the deflection of radiant heat away from the thermal shield 500 and the insulation layer 530 can block the path of heat conduction through body of the thermal shield 500. In an alternative embodiment (not shown), the layer of reflective foil can be applied to the second or outer surface 515 of the support screen 510 so that the side of the thermal shield 500 having the support screen 510 may be the side that is positioned closest to the hot component on the vehicle.

Figure 12:
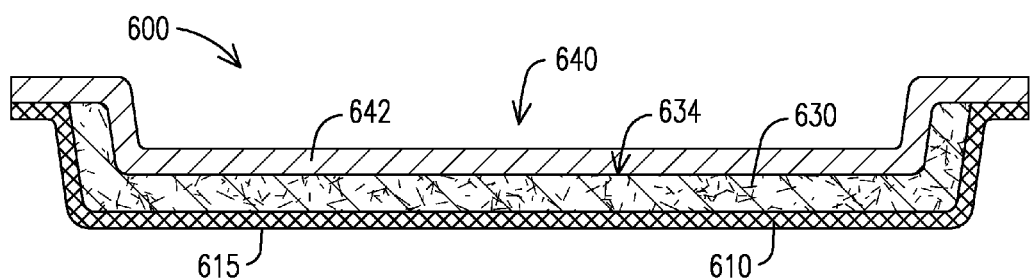
FIG. 12 is a schematic cross-sectional view of a lightweight thermal shield, in accordance with yet another representative embodiment.

FIG. 12 is a schematic cross-sectional view of another embodiment of the lightweight thermal shield 600 in which the exposed surface 634 of the insulation layer 630 is covered with a customizable layer 640, such as a pre-fabricated support shield 642 made from a lightweight thermoplastic or thermoset material. The pre-fabricated support shield 642 can be added after the support screen 610 and the adhered layer of insulation material 630 have been removed together from the manufacturing mold, and in one aspect may be bonded to the exposed surface 634 of the insulation layer 630 with an adhesive. In another aspect the pre-fabricated support shield 642 can be coupled to the support screen 610 around the perimeter of the thermal shield 600 with an adhesive or mechanical fasteners. The pre-fabricated support shield 640 may be added to provide additional support, in the form of stiffness and damping, to the support screen 610 that is adhered to the opposite side of the insulation layer 630. In one aspect the pre-fabricated support shield 640 can be substantially rigid.

In yet another alternative embodiment (also not shown), a layer of reflective metallic foil can be applied to the second or outer surface 615 of the support screen 610 so that the side of the thermal shield 600 having the support screen 610 can be the side closest to the hot component on the vehicle, and the side of the thermal shield 600 having the customizable layer 640, such as the pre-fabricated support shield 642, can be located further from the hot component and on the other side of the thermal barrier provided by the reflective foil layer of insulating material 630.

With reference to both FIGS. 11 and 12, it is contemplated that additional customizable layers of various types can also be added to the exposed face of the insulation layer after the support screen and adhered layer of insulation material have been removed together from the manufacturing mold. In this case, the support screen and adhered layer of insulation material can become the core component of a modular insulation system for vehicles that allows for an additional customizable layer to be added to the either of the exposed surface of the insulating layer or to the second or outer surface of the support screen, per customer specifications. The customizable layer can be added to provided additional heat protection, supplemental structural support, or both, etc.

Figure 13:
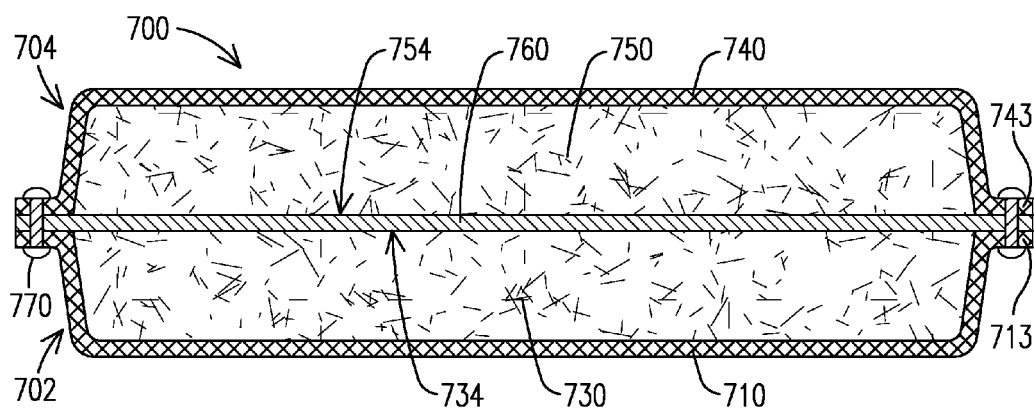
FIG. 13 is a schematic cross-sectional view of a lightweight thermal shield, in accordance with yet another representative embodiment.

FIG. 13 is a schematic, cross-sectional view of a lightweight thermal shield 700 in accordance with another representative embodiment, in which the lower half 702 of the thermal shield 700 having a first support screen 710 and a first insulation layer 730 has been formed separately from the upper half 704 having a second support screen 740 and a second insulation layer 750. The insulation layers 730, 750 have been formed within a mold to fill the volumes bounded by the flat surfaces and the sidewalls of the support screens, so that exposed surfaces 734, 754 of the insulation layers 730, 750 are substantially level and the thickness of the insulation layers vary in accordance with the curved surface features formed into their respective support screens 710, 740.

Furthermore, the center thickness of each of the insulation layers 730, 750 can generally be greater than those thermal shield embodiments having insulation layers with a constant thickness. For instance, the center thickness of each of the insulation layers 730, 750 can range from about ½ inches to about 2 inches or greater, resulting in a lightweight thermal shield having an overall thickness ranging from about 1 inch to about 4 inches or more. Such thicknesses and their resulting insulating capability is generally not possible for conventional heat shields that utilize the more traditional metallic sheets or sheet metal layers, as the heat shield becomes too heavy and cumbersome for practical use. Accordingly, the lightweight thermal shield of the present disclosure can provide a significant increase in insulating capability that is not available in the prior art.

After manufacture of the separate halves, the exposed surfaces 734, 754 of the insulation layers 730, 750 can then be aligned and the two halves 702, 704 coupled together along their perimeter flanges 713, 743 to form the completed thermal shield 700. The two halves 702, 704 can be coupled together using a conventional coupling system or device 770 such a rivets, bolting, clips or adhesive. In the illustrated embodiment, moreover, an additional layer of insulating material 760 can be placed between the two halves 702, 704 prior to the final assembly of the thermal shield 700. In one aspect, the additional layer of insulating material 760 can be a sheet of very low-density insulating material that may operate to further increase the overall insulating performance of the thermal shield 700 in comparison to the fiber-based insulation layers 730, 750 alone.

Figure 14:
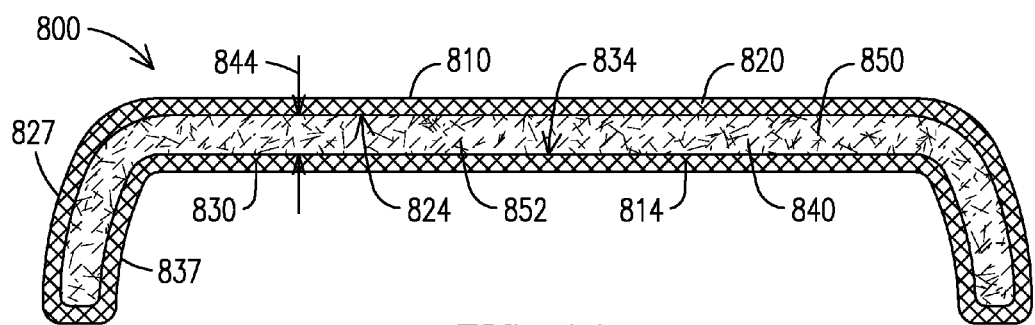
FIG. 14 is a schematic cross-sectional view of a lightweight thermal shield, in accordance with yet another representative embodiment of the present disclosure.

FIG. 14 illustrates another embodiment of the lightweight thermal shield 800 that includes a shield body 810 formed from a first support layer 820 and a second support layer 830 that together surround a hollow interior cavity 840. In this double-sided configuration, the cavity 840 is filled with an insulation layer 850 that is more flexible and pliable than the substantially rigid insulation material described above, so that it may bend together with the shield body 810 while maintaining a substantially constant thermal barrier between the interior surface 824 of the first support layer 820 and the interior surface 834 of the second support layer 830.

Both the first support layer 820 and the second support layer 830 can also be made from a planar sheet of a shapeable yet resiliently-bendable material that has been pressed into a first three-dimensional shape that includes various curved features 827, 837 that extend out-of-plane to the initial plane of the sheet. In one aspect, the material forming the first and second support layers 820, 830 can be a stainless steel wire mesh material 814. The individual wires of the mesh material 814 can be cold-worked or permanently bent in a press to assume the desired shape of the out-of-plane surface features 827, 837. During subsequent bending and flexing, the individual wires may continue to deform elastically around their new contours to elastically accommodate a portion of an applied bending and flexing. Without being bound to any particular theory, it is also thought that the plurality of interwoven wires may also move and slide relative to one another, so that the relative positions and spacing between the wires can also change to elastically accommodate a portion of the applied bending and flexing. Accordingly, the structure of the material 814 forming the first and second support layers 820, 830 can undergo substantial flexing and deflection without being permanently bent out of the desired shape.

It is to be appreciated, however, that the first support layer 820 and the second support layer 830 may also be formed from different materials and manufacturing methods, such as from a high-temperature polymer, thermoplastic or thermoset material that can be shaped through injection molding. These and other materials and methods of making the first support layer 820 and the second support layer 830 are also possible and considered to fall within the scope of the present disclosure.

The two support layers 820, 830 can be coupled together along their respective perimeter portions using a conventional coupling system or device such a rivets, bolting, clips or adhesive. In addition, the first support layer 820 and the second support layer 830 can be coupled together with a spacing 844 between the first interior surface 824 and the second interior surface 834 that can be substantially constant, at least in the central portion of the interior surfaces between the sidewalls 827, 837.

In one aspect, the flexible and pliable insulation material 850 can comprise an insulating fiber fill material, such as a flexible, high-temperature fiberglass or ceramic-based fiber batting 852. The fiber batting material 852 can be evenly distributed throughout the cavity 840 within the shield body 830 and be at least partially compressed so that fiber batting material 852 forms a compliant and flexible insulation layer 850 that substantially fills and conforms to the shape of the cavity 840, even as the cavity 840 may deform as the thermal shield 800 twists and bends in response to an applied force or vibration.

The combination of the resiliently-bendable support layers 820, 830 forming the shield body 810 and the conformable or pliable insulation layer 850 provides for a heat shield 800 that is both lightweight and capable of providing suitable thermal protection for the heat-sensitive systems it is configured to protect. Furthermore, it has also been discovered that the combination is further resistant to the high vibration levels that can be found in the vehicular heat shield application. It is thought that the lightweight and resiliently-bendable support layers 820, 830 may more easily move in accordance with, rather than resist, the motion of the support structure to which the heat shield is attached, while the conformable or pliable insulation layer 850 can provide the heat shield 800 with a substantial degree of vibration damping. Consequently, the likelihood of structural failure from high-cycle fatigue is greatly reduced, and the heat shield can maintain its structural integrity for an extend periods of time.

Figure 15:
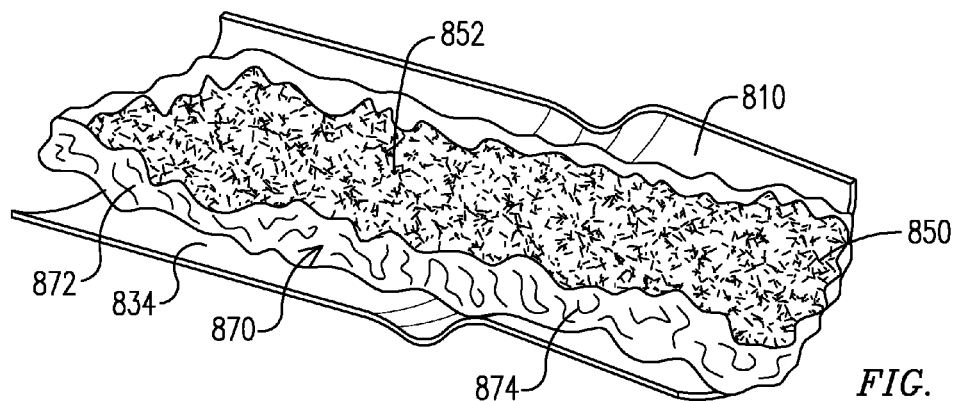
FIG. 15 is a partially assembled perspective view of another embodiment of the lightweight thermal shield of FIG. 14.

FIG. 15 illustrates another aspect of the thermal shield in which a reflective layer or barrier 870 can be provided between the interior surfaces of the support layers and the fiber batting material 852 forming the insulation layer 850. The reflective barrier 870 can operate to deflect radiant heat away from the thermal shield while the insulation material 852 can block the path of heat conduction through body 810 of the thermal shield. In one aspect, the reflective barrier 870 can comprise a metallic foil 872, such as aluminum foil. It has further been discovered that crumpling the metallic foil 872 to create numerous bends and crumple zones 874 can allow for the reflective barrier 870 to bend and twist along with the shield body without sustaining damage.

Figure 16:
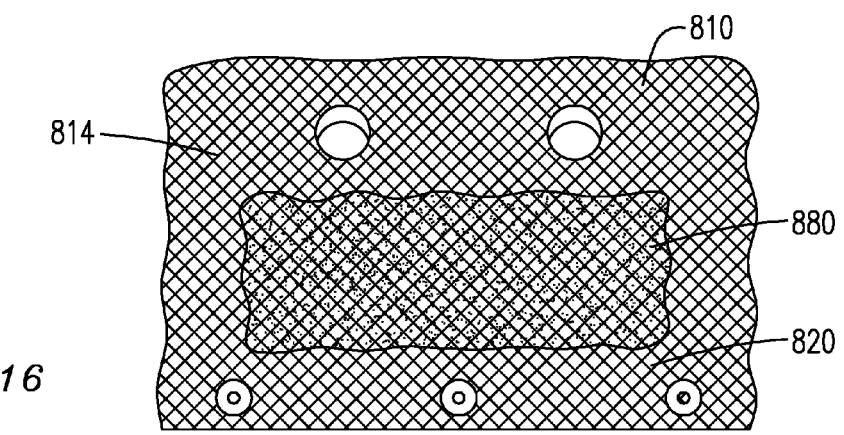
FIG. 16 is a perspective view of the surface of one of the support layers of the lightweight thermal shield of FIG. 14.

Similar to the reflective barrier discussed above, in another aspect of the lightweight thermal shield illustrated in FIG. 16, the outer surfaces of one or both of the resiliently-bendable support layers can be coated with a highly-reflective or low-emissivity coating 880 that can provide for the deflection of radiant heat away from the thermal shield while the insulation material 852 may block the path of heat conduction through body 810 of the thermal shield. For example, the low-emissivity coating 880 can comprise a high-temperature, low-emissivity radiant barrier paint, such as one of the several the LO/MIT™ radiant barrier paints provided by SOLEC-Solar Energy Company. In addition, it has also been discovered that the low-emissivity coating 880 may also provide oxidation protection for the shapeable yet resiliently-bendable mesh material 814 forming the support layer 820.

Figure 17:
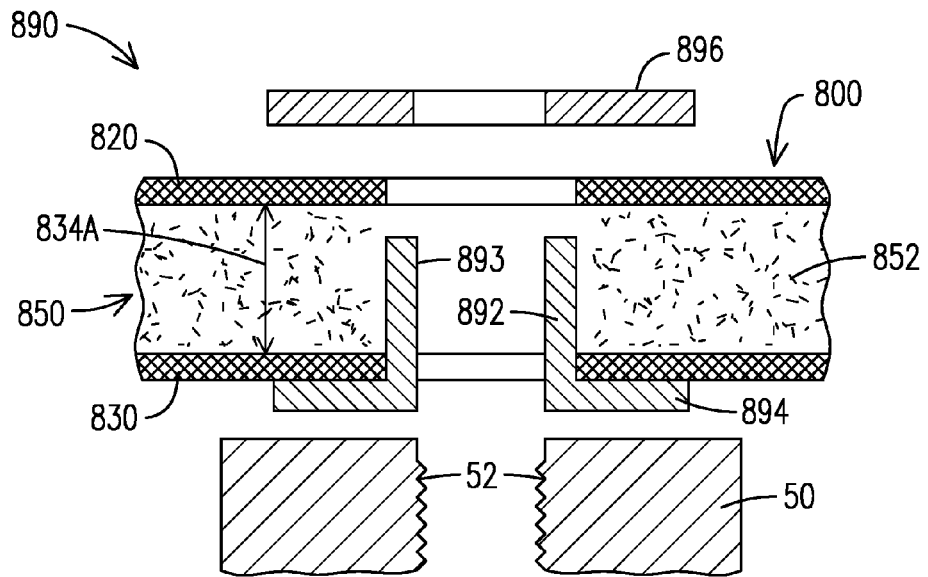
FIG. 17 is an exploded schematic view of a device for mounting the lightweight thermal shield of FIG. 14 to a vehicle.
Figure 18:
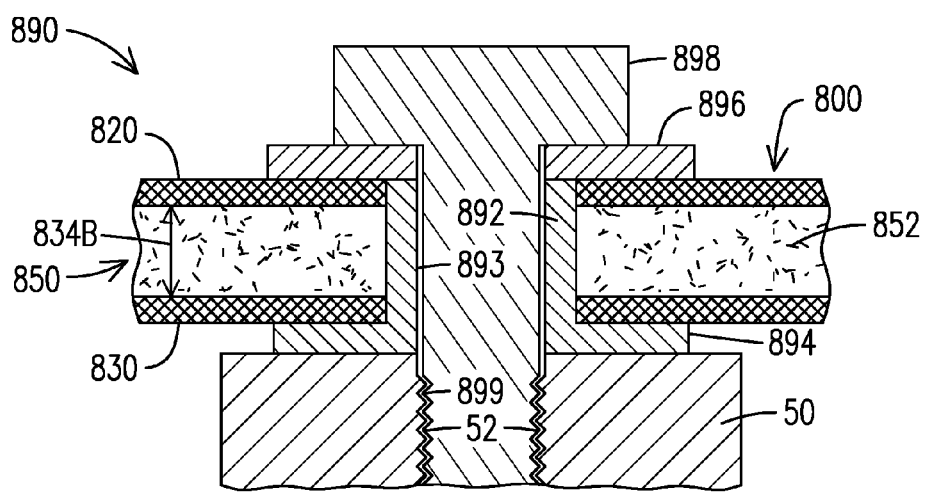
FIG. 18 is an assembled schematic view of a device of FIG. 17 for mounting the lightweight thermal shield to a vehicle.

One embodiment of a mounting configuration 890 for attaching the lightweight thermal shield 800 to the frame or bracket 50 of the vehicle is shown in FIGS. 17-18. The mounting configuration 890 can include a bushing 892 having a interior cylinder portion 893 inserted through a hole in the support layer 820 and a washer portion 894 that rests against the outer surface of the support layer. The mounting configuration 890 can also include a separate outer washer 896 that is positioned around a hole in the opposite support layer 830, and an attachment bolt 898 having a threaded end 899 that connects with a threaded hole 52 in the bracket 50.

Prior to mounting the thermal shield 800 to the bracket 50 (FIG. 17), the interior surfaces of the support layers 820, 830 can be pushed apart slightly by the compliant insulation material 852 that forms the insulation layer 850, to form a first gap 834A. During installation, however, the bolt 898 can press down on the outer washer 896, that in turn forces support layer 820 inward toward support layer 830, compressing the insulation material 852 and closing the distance between the support layers 820, 830 to a second gap 834B. The gap 834B can become fixed when the bottom surface of the washer 896 contacts the edge of the interior cylinder portion 893 of the bushing 892, while the washer portion 894 of the bushing 892 bears against the face of the bracket 50. Further tightening of the bolt will better secure the thermal shield 800 to the bracket 50 of the vehicle, but without further compression of the insulation layer 850 of the thermal shield.

Thus, the mounting configuration 890 can provide for secure attachment of the lightweight thermal shield 800 to the frame or bracket 50 of the vehicle while still allowing for the thermal shield 800 to resiliently flex in response to the high vibration levels that can be found in the vehicular heat shield application.

Figure 19:
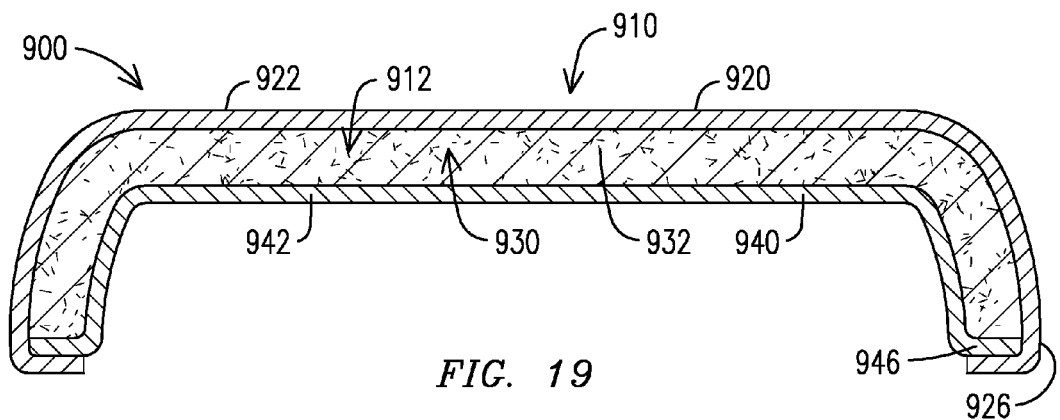
FIG. 19 is a schematic cross-sectional view of a lightweight thermal shield, in accordance with another representative embodiment of the present disclosure.

FIG. 19 is a schematic cross-sectional illustration of another embodiment of the lightweight thermal shield 900 having a layered or sandwich construction, and in which the core layer 930 comprises an insulation material 932 as generally described above in reference to FIGS. 2-13, including the various formulations of the low-density dried fibrous insulation material particularly described above in reference to FIG. 6. However, in this embodiments the mesh support screens at the outer and/or inner surfaces of the core layer can be replaced with an outer shell layer 920 and an inner shell layer 940 made from a solid material, and that have been joined together at their perimeter edges 926, 946 to form a hard shell body 910 that surrounds and encloses an interior cavity or volume 912 that can be filled by the substantially rigid, low-density insulation layer 930. In one aspect the outer shell layer 920 and the inner shell layer 940 can be made from a metallic material 922, 942, and in a preferred embodiment can comprise a very thin but hard sheet of aluminized steel. In other aspects one or both of the outer or inner shell layers can be made from a solid thermoplastic or thermoset material that is also lightweight and hard.

The outer 920 and inner 940 shell layers can form a barrier that is impermeable to liquids and prevents any vehicular fluids from coming into contact with the core insulation material 932. Shell layers made from aluminized steel can also provide a reflective barrier that reflects much of the heat from the hot engine component away from the thermal shield 900, while non-metallic shell layers may be covered with a reflective metallic foil that provides similar protection. However, unlike the prior art heat discussed generally above with reference to FIG. 1, the outer shell layer 920 and inner shell layer 940 are formed with insufficient thickness to provide, by themselves, the thermal shield 900 with the necessary shape and stiffness that allows it to maintain its structural integrity in the harsh vehicular environment. Instead, the core layer 930 of dried insulation material 932 can be formed with a thickness and shape that is sufficient to provide a substantial portion, and in some aspects a primary or majority portion, of the shape and stiffness of the overall thermal shield 900. In other words, the lightweight thermal shield 900 that is both strong and durable can be formed by substantially reducing the thickness (and weight) of the inner and outer metallic shell layers while modifying the composition and substantially increasing the thickness of the lightweight core layer 930 to provide the structure with the necessary shape and stiffness.

Furthermore, in addition to providing the thermal shield 900 with its structural shape and stiffness along with its heat insulation capabilities, the core layer 930 may also include substantial damping properties that can be tailored to control the natural response of the thermal shield to the high vibrations generated by the vehicle. For instance, employing different techniques such as creating gaps at predetermined portions in the core layer 930, or locally shaping or compressing different portions of the still-damp consolidated insulation material 932 after forming the insulation layer but prior to drying, can be used to alter the local stiffness and damping characteristics of the core layer 930 and to affect the overall vibrational response of the thermal shield 900.

It is to be appreciated that the schematic illustration of FIG. 19 is not necessarily drawn to scale, and that the thickness of the core layer 930 relative to the shell layers 920, 940 can be greater than the proportions illustrated in the drawing. For instance, in a preferred embodiment each of the outer 920 and inner 940 shell layers can be formed from solid aluminized steel having a thickness of about 0.012 inches, while the thickness of the core layer 930 can be about 0.25 inches. In other words, the core layer 930 can generally be about twenty times thicker than the shell layers 920, 940, and can comprise up to about 91% of the thickness of thermal shield 900. In this aspect the outer 920 and inner 940 shell layers may be only slightly more stiff than a thin metallic foil having a thickness of about 0.007 inches, and thus may contribute only a minor portion to the overall shape and structural stiffness of the completed thermal shield. Nevertheless, because the dried insulation material 932 that forms the core layer 930 can remain susceptible to local impact damage and breaking, the solid shell layers 920, 940 can provide, in addition to the other features described above, valuable protection from contact and impacts from external objects that helps preserve the structural integrity of the core layer 930.

It is believed that providing the thermal shield 900 with a relatively thick core layer 930 in comparison to the outer shell layers 920, 940 is unprecedented in the industry. This is because it has been heretofore unappreciated that a core layer 930 of dried insulation material 932, which generally can be brittle and susceptible to impact damage, cracking and degradation in the high vibration vehicular environment, could be adapted to heat shield applications in a manner that would allow the core insulation layer to provide and maintain a majority portion of the structural integrity of the thermal shield 900. For instance, in one embodiment the thickness of the core layer can be increased to about 0.75 inches, in which case the solid shell layers 920, 940 would comprise only about 3% of the thickness of the thermal shield, with the core layer 930 providing the remaining 97%. Thus, increasing the thickness of the low-density core layer 930 can generally increase both the structural strength and thermal shielding capabilities of the thermal shield 930 with only a minor increase in weight.

In another embodiment the thickness of the core layer can be reduced to about 0.125 inches, in which case the solid shell layers 920, 940 would comprise up to about 16% and the core layer 930 would comprise about 84% of the thickness of the thermal shield. The dimensions of the thinner embodiment may be closer to those of the prior art heat shield it is configured to replace, albeit substantially lighter, and thus may be a better option in situations where the spacing for the thermal shield is limited or fixed.

Accordingly, in various exemplary embodiments the combined thickness of the hard shell layers can range from about 16% to about 3% of the overall thickness of the thermal shield, while the corresponding thickness of the core insulation layer can range from about 84% to about 97% of the overall thickness of the thermal shield. Other thickness ratios are still possible, moreover, and may be considered to fall within the scope of the present disclosure.

Figure 20:
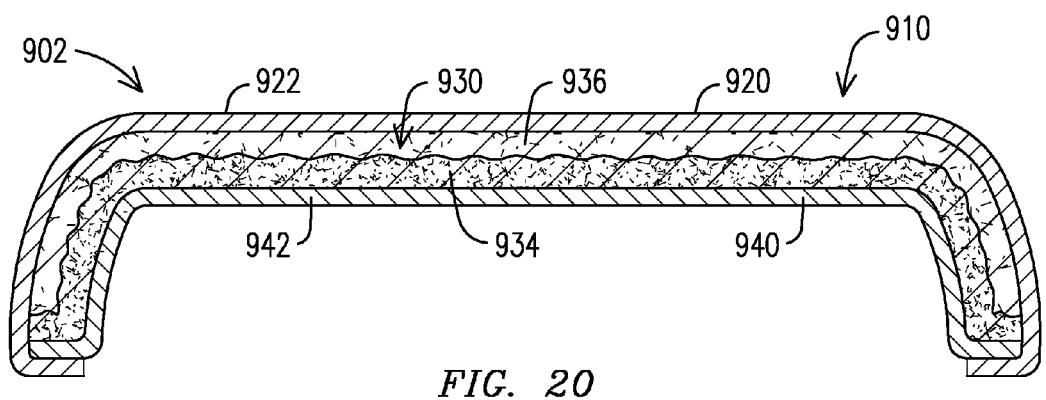
FIG. 20 is a schematic cross-sectional view of a lightweight thermal shield, in accordance with yet another representative embodiment.

In another aspect of the present disclosure illustrated in FIG. 20, the core layer 930 of the thermal shield 902 may be formed from two or more distinct layers of dried insulation materials having different properties and/or cost. For example, if it is determined that the inner shell layer 940 will be placed adjacent the hot engine or exhaust component, that an innermost layer 934 of the core insulation 930 can be formed with silica fibers that carry a greater temperature rating and ability to withstand the higher temperatures without degrading over time, but which silica fibers also tend to be more expensive. An outermost layer 936 that utilizes less expensive fiberglass fibers can then be applied over the inner layer 934 to complete the overall thickness of the core insulation layer 930 that provides the desired structural strength and insulating characteristics. In this way a thermal shield 902 that continues to include each of the necessary physical features and attributes can be constructed with less expensive materials, thereby reducing the overall cost of the thermal shield 902.

Figure 21:
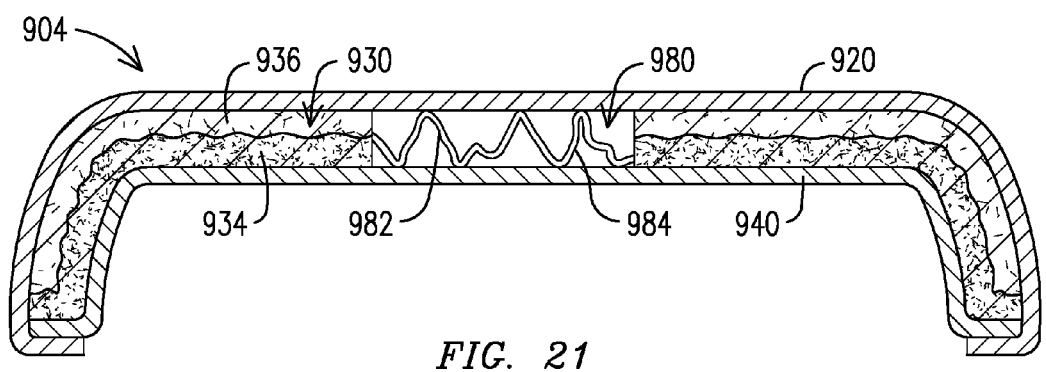
FIG. 21 is a schematic cross-sectional view of a lightweight thermal shield, in accordance with yet another representative embodiment.

In another embodiment of the thermal shield 904 shown in FIG. 21, the core layer 930 of the thermal shield 902 can be formed with voids or gaps 980 in the dried insulation material 934, 936. These gaps 980 may be utilized to control or tune the vibrational characteristics of the thermal shield 904, or to remove the dried insulation material 934, 936 from portions of the thermal shield 904 that may be susceptible to high levels of vibration. For example, even with a lightweight core layer 930 having improved damping properties, it can be expected that the thermal shields of the present disclosure will continue to exhibit natural frequencies having various modes of vibration. When one or more of those vibrational modes results in an amplified vibrational response at a particular location along the thermal shield, the increased motion or flexing at that location may result in degradation of the insulation material, thereby reducing the useful life of the thermal shield. To avoid the likelihood of premature wear or damage, the insulation material 934, 936 can removed at that location and replaced with a separately-installed thermal insert 982 that is less likely to experience damage from the amplified motion. In one aspect, the thermal insert can be a crumpled body of metallic foil 984, such as aluminum foil, that can accommodate the increased motion or flexing of the thermal shield 904 without degradation while substantially maintaining the thermal barrier provided by remainder of the core layer 930. The practice of using gaps 980 filled with lightweight thermal inserts 982 or metallic foil 984 in a manner that does not comprise the structural integrity of the core insulation layer 930 can also be used to further reduce the weight of the lightweight thermal shield 904.

Figure 22A:
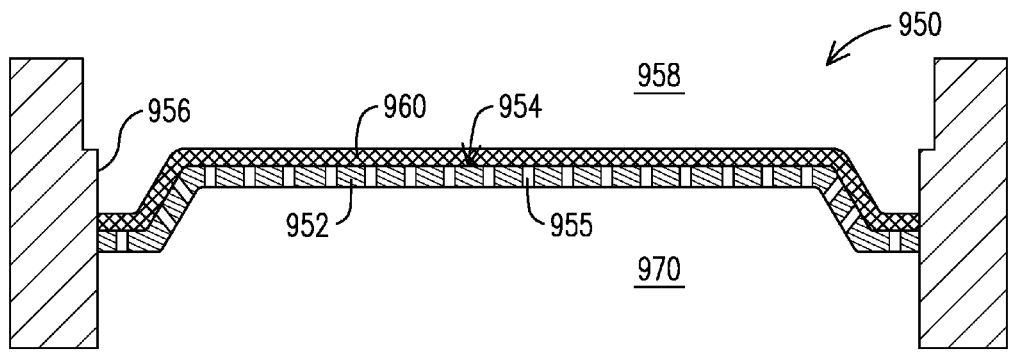
FIGS. 22A-22F are schematic cross-sectional views of a method of making the lightweight thermal shield of FIG. 20.

One method of making the lightweight thermal shield is illustrated in FIGS. 22A-22F. As shown in FIG. 22A, the method can generally utilize a mold 950 having a contoured mold plate 952 with a top mold surface 954. The mold plate 952 can further include a plurality of apertures or perforations 955 that allow for the passage of air and liquids through the mold plate 952. The mold 950 can also include sidewalls 956 that surround the mold plate 952 to define the mold cavity 958 that contains the wet insulation slurry during the manufacturing process, and to define the outer edges of the de-watered and consolidated insulation layer. In one aspect, the mold can further include a fine mesh layer or screen 960 that is secured to the top mode surface 954 and that serves to better distribute the suction or vacuum that is being pulled from a source of vacuum 970 located below or behind the mold plate 952. In addition, the fine mesh of the screen 960 can define voids between the screen elements that are too small to allow for the passage of the fibrous material in the insulation mixture, and thereby prevent the fibrous material from plugging the perforations 955 in the mold plate 952. The mold 950 can also include a cover (not shown) that can cover and seal the top of the mold cavity 958 so that the air pressure within the mold cavity can be drawn down to a negative pressure to withdrawn moisture from the wet insulation slurry.

In one aspect the screen 960 can be shaped to match the contours of the mold plate 952, as shown in FIG. 22A. Alternatively, the screen 960 can be shaped to form a contoured surface while the mold plate 952 is substantially generic or straight and with structural elements that help support the screen at various locations. If the screen 960 is formed with sufficient strength to hold the wet insulation slurry by itself during the manufacturing process, such as with smaller thermal shields with reduced surface areas, one of skill in the art may understand that the fixed or rigid mold plate 952 may be optional and need not be included in the mold 950.

Figure 22B:
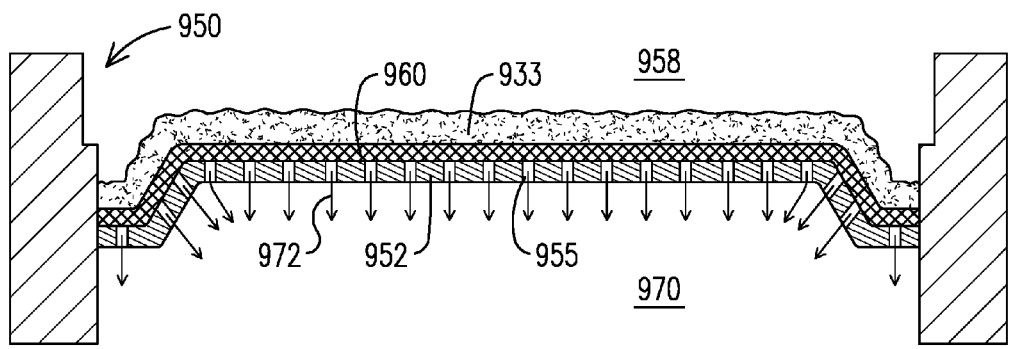
Figure 22C:
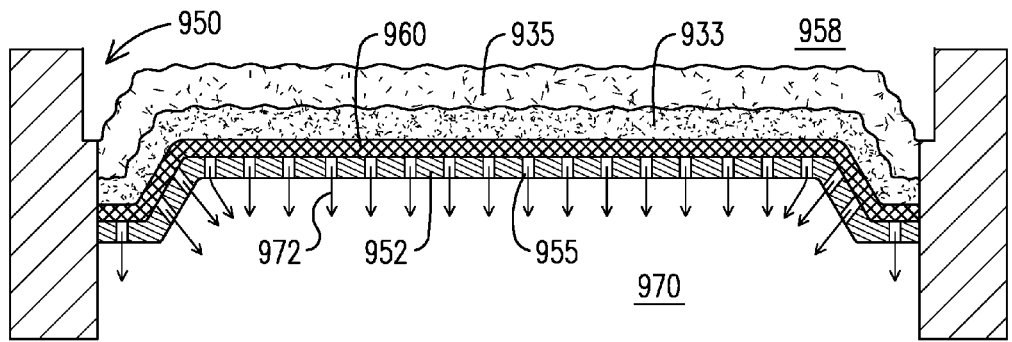

To produce the dual-layered lightweight thermal shield of FIG. 20, for example, a first slurry mixture can be introduced into the mold cavity 958 and then pulled against the screen 960 by the vacuum 972, as illustrated in FIG. 22B, until it forms an evenly-distributed layer of de-watered and consolidated insulation material 933 having a substantially constant thickness across the contoured surface area of the screen 960. After the first layer of de-watered insulation material 933 has been formed, the second slurry mixture can be introduced into the mold cavity 958 and then pulled against the top surface of first layer 933 by the vacuum 972, as illustrated in FIG. 22C, until it forms the second layer of de-watered and consolidated insulation material 935 that also has a substantially constant thickness across the contoured the top surface of first layer 933. Because the first slurry mixture remains substantially porous in its damp, de-watered and consolidated state, the vacuum 972 can continue to pull the fluids from the second slurry mixture through the first layer 933 until it is also de-watered and consolidated into the shape of the second insulation layer 935. This suction operation can also serve to mechanically intermix and bond together the first and second insulation layers at their joint boundary.

Figure 22D:
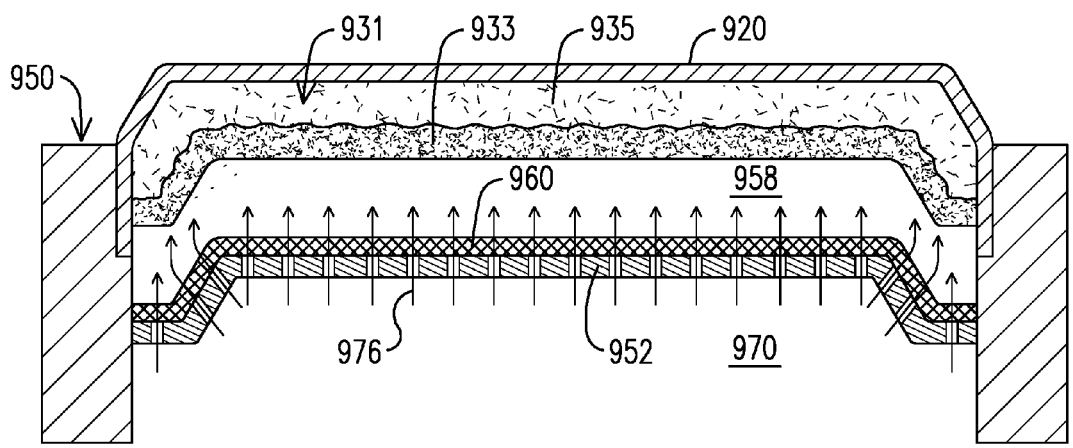

As illustrated in FIG. 22D, after the build-up of the core insulation layer 930 in the mold 950 is complete, the outer shell layer 920 can be positioned around the mold cavity 958 and the source of vacuum reversed into a source of positive pressure 974, with the resulting pressurized air 976 pushing or blowing through the mold plate 952 and screen 960 to eject the de-watered and consolidated core insulation layer 931 into the outer shell layer 920. Thus, it may not be necessary to manually remove the built-up core insulation layer 930 from the mold, so that the risk of damaging the fragile core insulation layer 931 in its damp, consolidated state can be substantially minimized.

Generally, the core insulation layer 931 is still damp when ejected into the outer shell layer 920, and can thus closely conform to any discontinues, irregularities or changes in shape on the inner surface of the outer shell layer 920. This can allow for a tight mechanical fit between the core insulation layer 930 and the outer shell layer 920 to be established upon drying. Thus, in some aspects the use of adhesives or binders to secure the core insulation layer 930 to the outer shell layer 920 may not be necessary, while in other embodiments adhesive or binders can be used further secure the core insulation layer 930 to the outer shell layer 920 during the drying process.

Furthermore, it is also to be appreciated that FIGS. 22A-22D are simply schematic illustrations of a representative mold configuration 950 that could be used in a variety of manufacturing processes. For instance, in one aspect the mold 950 can be a stationary fixture in which a predetermined amount of insulation slurry is introduced into the mold cavity 958 and evenly distributed across the surface of the screen 960 by the vacuum 972. In another aspect, however, the mold 950 can be a portable fixture coupled to the end of a vacuum tube, and which is then dipped into a container of insulation slurry with an active vacuum and for a predetermined period of time to allow for a layer of insulation material of desired thickness to build up on the screen 960. It is also to be appreciated that the screen 960 and/or perforated mold plate 952 can be formed into a variety of shapes and with a wide variety of contours, including grooves and depressions that result in ribs, projections and other surface features that can extend from the inner surface of the core insulation layer 930. Thus, while the backside of the built-up insulation layers 933, 935 can have a substantially constant thickness as measured from the nominal surface of the screen 960 or top surface 954 of the mold plate 952, the first insulation layer can be locally thicker or thinner in certain portions, depending on the local contours of the screen 960 or mold plate 952.

Moreover, additional surface features similar to the posts 448 projecting outwardly from the molding surface 440 of the mold 420 (FIG. 5) can also be included with the mold plate 952 and/or the screen 960 to block the deposition of the insulation materials 933, 935 at predetermined locations, in order to form bolt apertures, voids 940 (FIG. 21) or other intentional gaps in the core insulation layer 930.

Figure 22E:
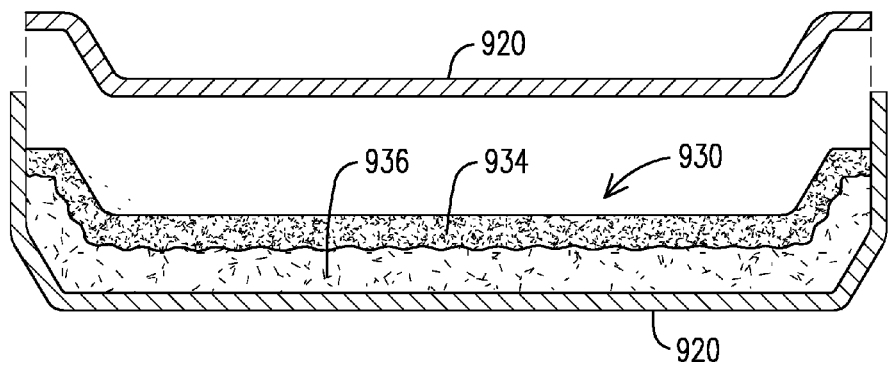

With continuing reference to FIG. 22E, the damp, de-watered and consolidated core insulation layer can then be dried within the outer shell layer 920 to form the completed core insulation layer 930 comprising one or more layers of dried insulation material 934, 936. As stated above, during the drying process the core insulation layer 930 can develop a tight bond with the outer shell layer 920 so that the protective outer shell layer 920 remains firmly attached to the structural insulation layer 930 throughout the useful life of the lightweight thermal shield. Although the consolidated core insulation layer 931 can generally be heat dried within an oven at a temperatures greater than 100° C. or 200° C., in one aspect the layer(s) of insulation material can be left to air dry for a longer period of time at ambient temperature.

Figure 22F:
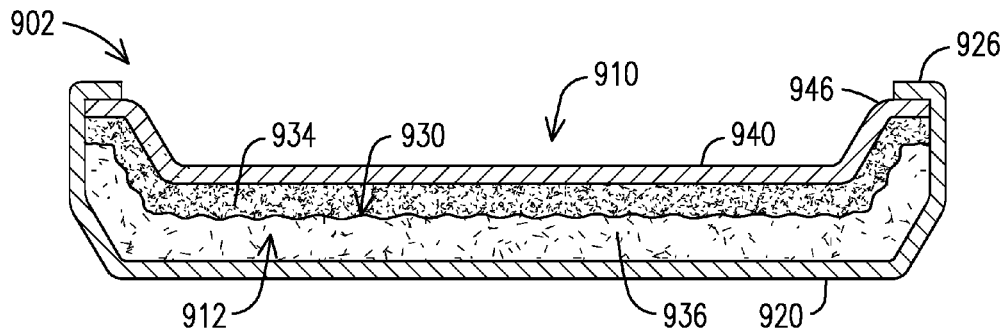

Once the dried core insulation layer 930 has been formed, the inner shell layer 940 can be installed over the exposed surface of the inner insulation layer 934, with the outer shell layer 920 and an inner shell layer 940 being joined together at their perimeter edges 926, 946 to form a hard shell body 910 that surrounds and encloses the interior volume 912, as shown in FIG. 22F. Also shown in the drawing, in one aspect an additional length of the perimeter edge 926 of the outer shell layer 920 can be folded or crimped over the perimeter edge 946 of the inner shell layer 940 to complete the formation of the hard shell body 910. However, it is to be appreciated that other techniques and methods for joining the two outer shell layers 920, 940, such as spot welding, laser welding, adhesives, fasteners and the like, are also contemplated and considered to fall within the scope of the present disclosure.

Figure 23A:
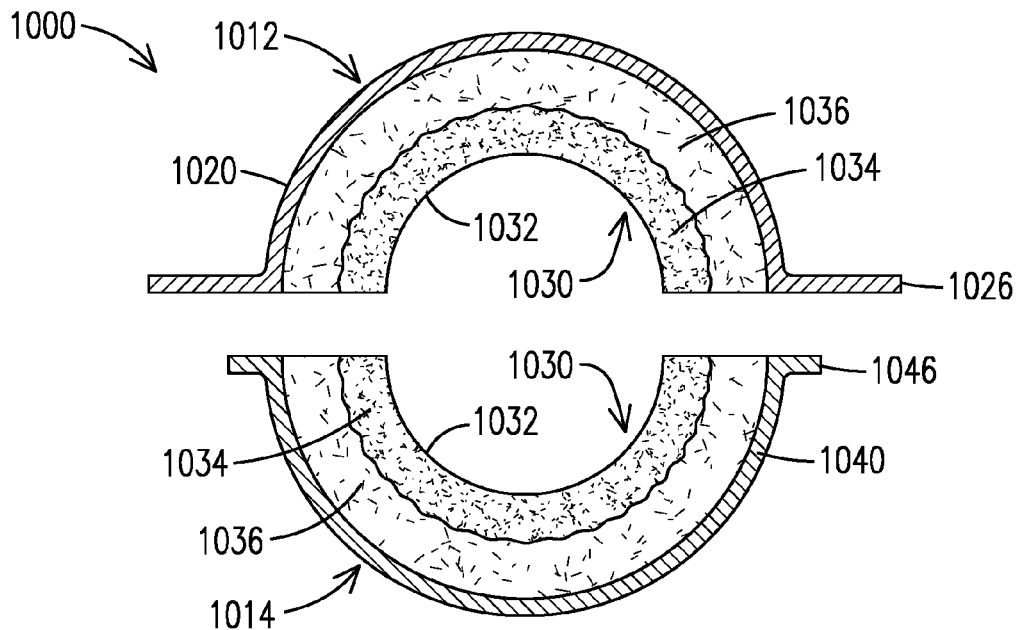
FIGS. 23A and 23B are schematic cross-sectional view of a lightweight thermal shield, in accordance with yet another representative embodiment.
Figure 23B:
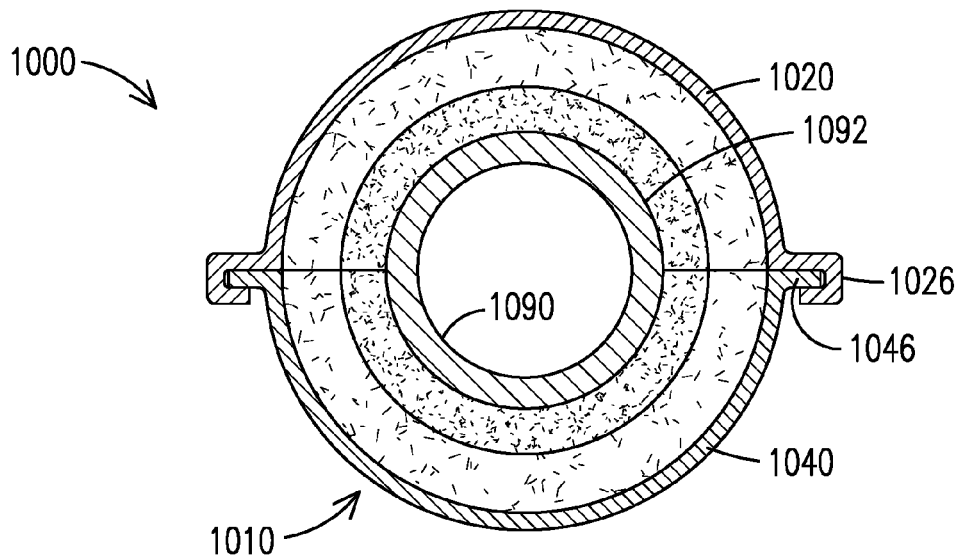

Illustrated in FIGS. 23A and 23B is yet another embodiment of the thermal shield 1000 having a core insulation layer 1030 comprising one or more layers of dried insulation material 1034, 1036, and that is surrounded by a solid outer shell layer 1020. The outer shell layer 1020 can form a barrier that is impermeable to liquids and that protects the core insulation layer 1030 from impact damage with external objects. As described above, the core insulation layer 1030 can be substantially thicker than the solid outer shell layer 1020, and can provide a majority portion of the stiffness and structure of the overall thermal shield 1000. In the embodiment of FIGS. 23A and 23B, however, the thermal shield 1000 may not include an inner shell layer, and instead the inner surface 1032 of the core insulation layer 1030 can remain exposed for direct contact with a hot engine or exhaust component, such as the hot exhaust pipe 1090 illustrated in FIG. 23B.

As shown in the FIGS. 23A-23B, the thermal shield 1000 can further comprise two halves having a clam-shell shape, such as a first or upper half 1012 having the core insulation layer 1030 installed within the first outer shell layer 1020, and a second or lower half 1014 having the core insulation layer 1030 installed within a second outer shell layer 1040. The first half 1012 and second half 1014 can be positioned together around the hot engine or exhaust component 1090 so that the inner surface 1032 of the core insulation layer 1030 contacts the outer surface 1092 of the hot object 1090. The perimeter ends 1026, 1046 of the outer shell layers can then be coupled together, as described above, to complete the formation of the hard shell body 1010 and install the thermal shield 1000 around the hot object 1090.

Figure 24:
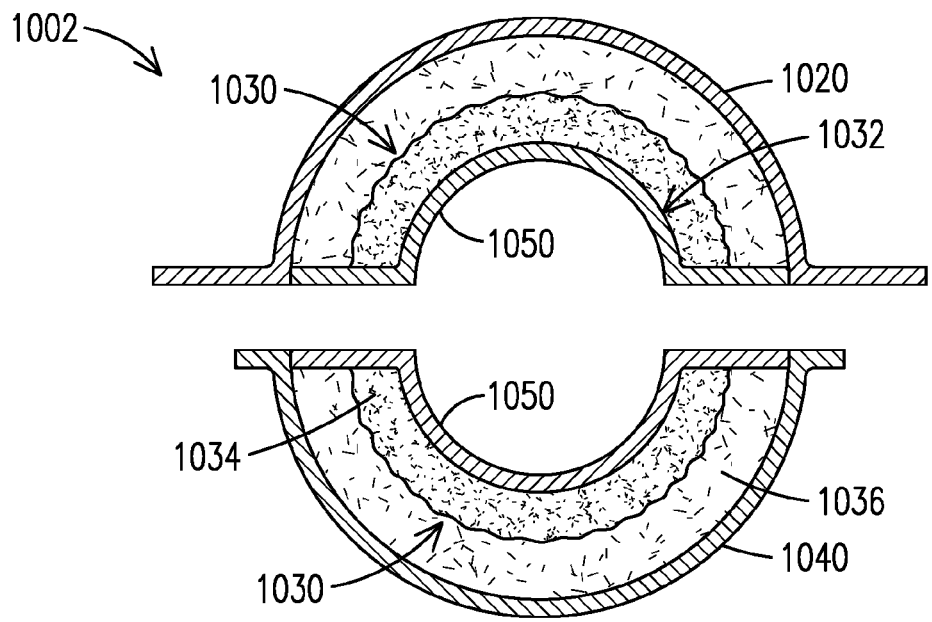
FIG. 24 is a schematic cross-sectional view of a lightweight thermal shield, in accordance with yet another representative embodiment.

The dry insulation material at the inner surface 1032 of the core insulation layer 1030 may be generally configured to withstand direct contact with the hot object 1090 without degradation or dusting cause by relative movement between the outer surface 1092 of the hot object 1090 and the inner surface 1032 of the core insulation layer 1030. Nevertheless, it may be desirable to reduce the amount of rubbing contact between the two surfaces without taking the steps of adding an inner shell layer to cover the inside surface 1032 of the core insulation layer 1030. Thus, in one aspect of the thermal shield 1002 shown in FIG. 24, a scrim liner 1050 can be installed over the exposed inner surface 1032 of the core insulation layer 1030. The scrim liner 1050 can further comprise a non-woven, reinforcing or abrasion-resistant fabric made from high temperature fibers, such as ceramic fibers, high temperature fiberglass, and the like.

Figure 25:
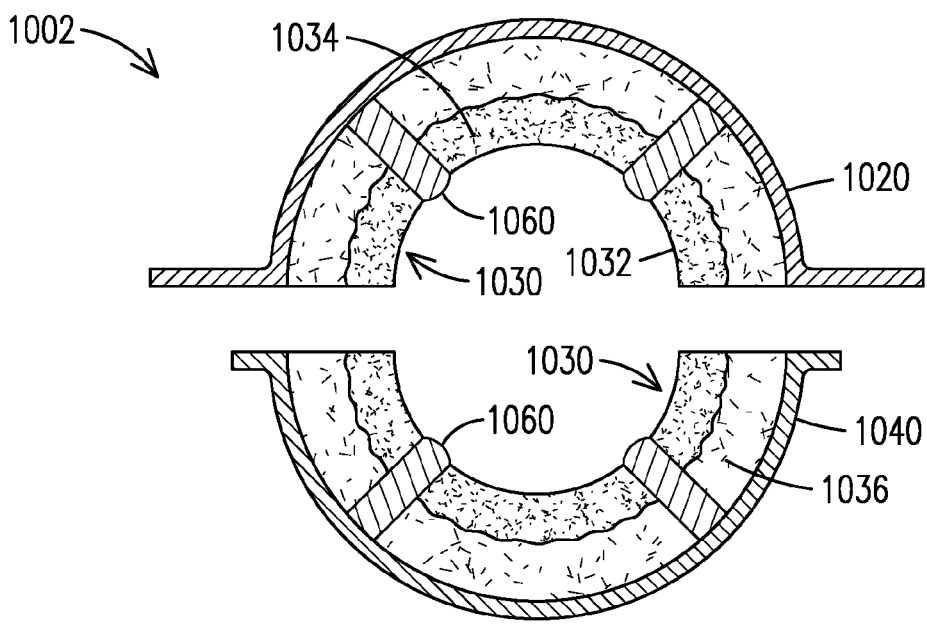
FIG. 25 is a schematic cross-sectional view of a lightweight thermal shield, in accordance with yet another representative embodiment.

And in yet another aspect of the thermal shield 1004 shown in FIG. 25, a plurality of thermally resistant stand-offs 1060 can be installed within the core insulation layers 1030 to maintain an air gap between the outer surface 1092 of the hot object 1090 and the inner surface 1032 of the core insulation layer 1030. The thermal stand-offs 1060 can further comprise a high temperature ceramic or glass or similar material that resists the conduction of heat from the hot component into the core insulation layer 1030.

The invention has been described in terms of preferred embodiments and methodologies considered by the inventors to represent the best mode of carrying out the invention. A wide variety of additions, deletions, and modification might well be made to the illustrated embodiments by skilled artisans within the scope of the invention. These and other revisions might be made by those of skill in the art without departing from the spirit and scope of the invention, with is constrained only by the following claims.

What is claimed is:

1. A thermal shield for inhibiting a transfer of heat between components on a vehicle, the thermal shield comprising:
    an outer shell layer formed from a solid and impermeable material having an outer surface, an inner surface, a thickness between the inner surface and the outer surface, and at least one curved portion, the outer shell layer defining a shape in three-dimensions;
    a core insulation layer coupled to the inner surface and substantially conforming to the shape of the outer shell layer, the core insulation layer being formed from at least one layer of dried fibrous insulation material having a thickness greater than about ten times the thickness of the outer shell layer.

2. The thermal shield of claim 1, wherein the core insulation layer has a thickness greater than or about twenty times the thickness of the outer shell layer.

3. The thermal shield of claim 1, wherein the outer shell layer comprises aluminized steel.

4. The thermal shield of claim 1, wherein the outer shell layer has a thickness ranging from about 0.010 inches to about 0.018 inches.

5. The thermal shield of claim 1, wherein the core insulation layer provides a majority portion of the overall structural strength and stiffness of the thermal shield.

6. The thermal shield of claim 1, wherein the dried fibrous insulation material further comprises 1401 millboard.

7. The thermal shield of claim 1, wherein the core insulation layer further comprises a first layer of dried fibrous insulation material formed from silica fibers and a second layer of dried fibrous insulation material formed from fiberglass fibers.

8. The thermal shield of claim 1, further comprising an inner shell layer formed from a solid and impermeable material coupled to a perimeter of the outer shell layer and covering an opposite surface of the core insulation layer.

9. The thermal shield of claim 8, further comprising a gap in the core insulation layer between the outer shell layer and the inner shell layer.

10. The thermal shield of claim 9, wherein the gap is filled with a thermal insert further comprising metallic foil.

11. The thermal shield of claim 1, further comprising a scrim liner overlying an opposite surface of the core insulation layer and adapted to contact a hot component.

12. The thermal shield of claim 1, further comprising a thermal standoff extending through an opposite surface of the core insulation layer and adapted to contact a hot component.

13. A thermal shield for inhibiting a transfer of heat between components on a vehicle, the thermal shield comprising:
- a outer shell layer formed from a solid and impermeable material having a first surface, a second surface a perimeter, and at least one curved portion, the outer shell layer forming a shape in three-dimensions;
- an insulation layer contacting the first surface and substantially conforming to the shape of the outer shell layer, the insulation layer being formed from at least one layer of dried fibrous insulation material;
- an inner shell layer formed from a solid and impermeable material coupled to the perimeter of the outer shell layer and covering an opposite surface of the insulation layer;
- wherein the insulation layer further comprises a first layer of dried fibrous insulation material formed from silica fibers and a second layer of dried fibrous insulation material formed from fiberglass fibers.

* * * * *